US011119966B2

(12) United States Patent
Mishra et al.

(10) Patent No.: US 11,119,966 B2
(45) Date of Patent: Sep. 14, 2021

(54) MIXED-MODE RADIO FREQUENCY FRONT-END INTERFACE

(71) Applicant: QUALCOMM Incorporated, San Diego, CA (US)

(72) Inventors: Lalan Jee Mishra, San Diego, CA (US); Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/546,495

(22) Filed: Aug. 21, 2019

(65) Prior Publication Data

US 2020/0081859 A1    Mar. 12, 2020

Related U.S. Application Data

(60) Provisional application No. 62/728,348, filed on Sep. 7, 2018.

(51) Int. Cl.
| | |
|---|---|
| *G06F 13/36* | (2006.01) |
| *G06F 13/40* | (2006.01) |
| *G06F 13/362* | (2006.01) |
| *G06F 13/38* | (2006.01) |
| *G06F 13/42* | (2006.01) |

(52) U.S. Cl.
CPC ...... *G06F 13/4054* (2013.01); *G06F 13/3625* (2013.01); *G06F 13/385* (2013.01); *G06F 13/4291* (2013.01)

(58) Field of Classification Search
CPC .................................................. G06F 13/4054
See application file for complete search history.

(56) References Cited

U.S. PATENT DOCUMENTS

| | | | | |
|---|---|---|---|---|
| 2002/0120880 A1* | 8/2002 | Simon | ................... | H04L 7/0008 713/400 |
| 2004/0210805 A1* | 10/2004 | Kimelman | .......... | G06F 13/4282 714/724 |
| 2011/0128977 A1* | 6/2011 | Suzuki | ................ | G06F 13/4239 370/498 |

(Continued)

OTHER PUBLICATIONS

International Search Report and Written Opinion—PCT/US2019/049697—ISA/EPO—dated Nov. 28, 2019.

*Primary Examiner* — Henry Tsai
*Assistant Examiner* — Dean Phan
(74) *Attorney, Agent, or Firm* — Qualcomm Incorporated

(57) ABSTRACT

The described systems, apparatus and methods enable communication between devices that use a single-wire link and devices that use a multi-wire link. One method performed at a master device includes transmitting a sequence start condition over a data wire of a serial bus, the sequence start condition indicating whether clock pulses are to be provided in a clock signal on a clock wire of the serial bus concurrently with a transaction initiated by the sequence start condition, transmitting a first datagram over the serial bus when the sequence start condition indicates that the clock pulses are to be concurrently provided in the clock signal, and transmitting a second datagram over the serial bus when the sequence start condition indicates that no clock pulses are to be concurrently provided in the clock signal. The second datagram may be transmitted in a data signal with embedded timing information.

16 Claims, 23 Drawing Sheets

(56) References Cited

U.S. PATENT DOCUMENTS

| | | | |
|---|---|---|---|
| 2011/0293035 A1* | 12/2011 | Kobayashi | H04L 27/0008 375/295 |
| 2012/0278646 A1* | 11/2012 | Gruber | G06F 13/4291 713/400 |
| 2015/0234773 A1 | 8/2015 | Sengoku | |
| 2015/0319273 A1 | 11/2015 | Trost | |

* cited by examiner

MIXED-MODE RADIO FREQUENCY FRONT-END INTERFACE

PRIORITY

This application claims priority to and the benefit of U.S. Provisional Patent Application Ser. No. 62/728,348 filed in the U.S. Patent Office on Sep. 7, 2018, the entire content of this application being incorporated herein by reference as if fully set forth below in its entirety and for all applicable purposes.

TECHNICAL FIELD

The present disclosure relates generally to serial communication and, more particularly, to providing a Radio Frequency Front-End interface that couples devices configured for one-wire communication and devices configured for two-wire communication.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a shared data communication bus, which may include a multi-drop serial bus or a parallel bus. General-purpose serial interfaces known in the industry include the Inter-Integrated Circuit (I2C or I²C) serial interface and its derivatives and alternatives.

The Mobile Industry Processor Interface (MIPI) Alliance defines standards and protocols for the Improved Inter-Integrated Circuit (I3C) serial interface, the Radio Frequency Front-End (RFFE) interface, the system power management interface (SPMI) and other interfaces. These interfaces may be used to connect processors, sensors and other peripherals, for example. In some interfaces, multiple bus masters are coupled to the serial bus such that two or more devices can serve as bus master for different types of messages transmitted on the serial bus. The RFFE interface defines a communication interface that can be for controlling various radio frequency (RF) front-end devices, including power amplifier (PA), low-noise amplifiers (LNAs), antenna tuners, filters, sensors, power management devices, switches, etc. These devices may be collocated in a single IC device or provided in multiple IC devices. In a mobile communication device, multiple antennas and radio transceivers may support multiple concurrent RF links. In another example, SPMI specifications defined by the MIPI Alliance provide a hardware interface that may be implemented between baseband or application processors and peripheral components. In some implementations, the SPMI is deployed to support power management operations within a device.

As device complexity increases, demand for input/output pins also increases and there is demand for simplified bus architectures.

SUMMARY

Certain aspects of the disclosure relate to systems, apparatus, methods and techniques that can support communication with device interfaces that use a single-wire link while some devices coupled to the single-wire link use multiple wires for communication.

In various aspects of the disclosure, a method performed at a master device coupled to a serial bus includes transmitting a sequence start condition over a data wire of a serial bus, the sequence start condition indicating whether clock pulses are to be provided in a clock signal on a clock wire of the serial bus concurrently with a transaction initiated by the sequence start condition, transmitting a first datagram over the serial bus when the sequence start condition indicates that the clock pulses are to be concurrently provided in the clock signal, and transmitting a second datagram over the serial bus when the sequence start condition indicates that no clock pulses are to be concurrently provided in the clock signal. The second datagram may be transmitted in a data signal with embedded timing information.

In one aspect, the sequence start condition has a first duration when indicating that the clock pulses are to be concurrently provided in the clock signal and a second duration longer than the first duration when indicating that no clock pulses are to be concurrently provided in the clock signal. In certain aspects, first data is encoded in the data signal using a pulse-width modulation encoder. Second data may be encoded in the data signal using a phase modulation encoder. The method may include transmitting a bit-timing reference over the data wire before transmitting the second datagram. The method may include controlling timing of the sequence start condition using a first clock frequency, and pulse-width modulating the data signal using a second clock frequency. The second clock frequency may be selected responsive to the bit-timing reference.

In various aspects of the disclosure, a data communication apparatus has an interface circuit adapted to couple the apparatus to two wires of a serial bus, and a protocol controller. The protocol controller may be configured to transmit a sequence start condition over a data wire of a serial bus, the sequence start condition indicating whether clock pulses are to be provided in a clock signal on a clock wire of the serial bus concurrently with a transaction initiated by the sequence start condition, transmit a first datagram over the serial bus when the sequence start condition indicates that the clock pulses are to be concurrently provided in the clock signal, and transmit a second datagram over the serial bus when the sequence start condition indicates that no clock pulses are to be concurrently provided in the clock signal. The second datagram may be transmitted in a data signal with embedded timing information.

In various aspects of the disclosure, a method performed at a 1-Wire slave device coupled to a serial bus includes receiving a first sequence start condition from a data wire of a serial bus, the sequence start condition indicating that a first datagram transmitted after the first sequence start condition is to be transmitted concurrently with clock pulses in a clock signal transmitted on a clock wire of the serial bus, receiving a second sequence start condition from the data wire, the second sequence start condition indicating that a second datagram transmitted after the second sequence start condition is to be transmitted with embedded clock information in a data signal, ignoring the first datagram, and demodulating the data signal to extract the second datagram.

In one aspect, the first sequence start condition and the second sequence start condition have different durations. In certain aspects, the method includes using a pulse-width modulation decoder to demodulate the data signal. The method may include using a phase modulation decoder to demodulate the data signal. The method may include receiving a bit-timing reference from the data wire after receiving the second sequence start condition. The method may include configuring the pulse-width modulation decoder using timing information obtained from the bit-timing reference.

In various aspects of the disclosure, a data communication apparatus has an interface circuit adapted to couple the apparatus to two wires of a serial bus, and a processor. The processor may be configured to receive a first sequence start condition from a data wire of a serial bus, the sequence start condition indicating that a first datagram transmitted after the first sequence start condition is to be transmitted concurrently with clock pulses in a clock signal transmitted on a clock wire of the serial bus, receive a second sequence start condition from the data wire, the second sequence start condition indicating that a second datagram transmitted after the second sequence start condition is to be transmitted with embedded clock information in a data signal, ignore the first datagram, and demodulate the data signal to extract the second datagram.

DETAILED DESCRIPTION

Figure 1:
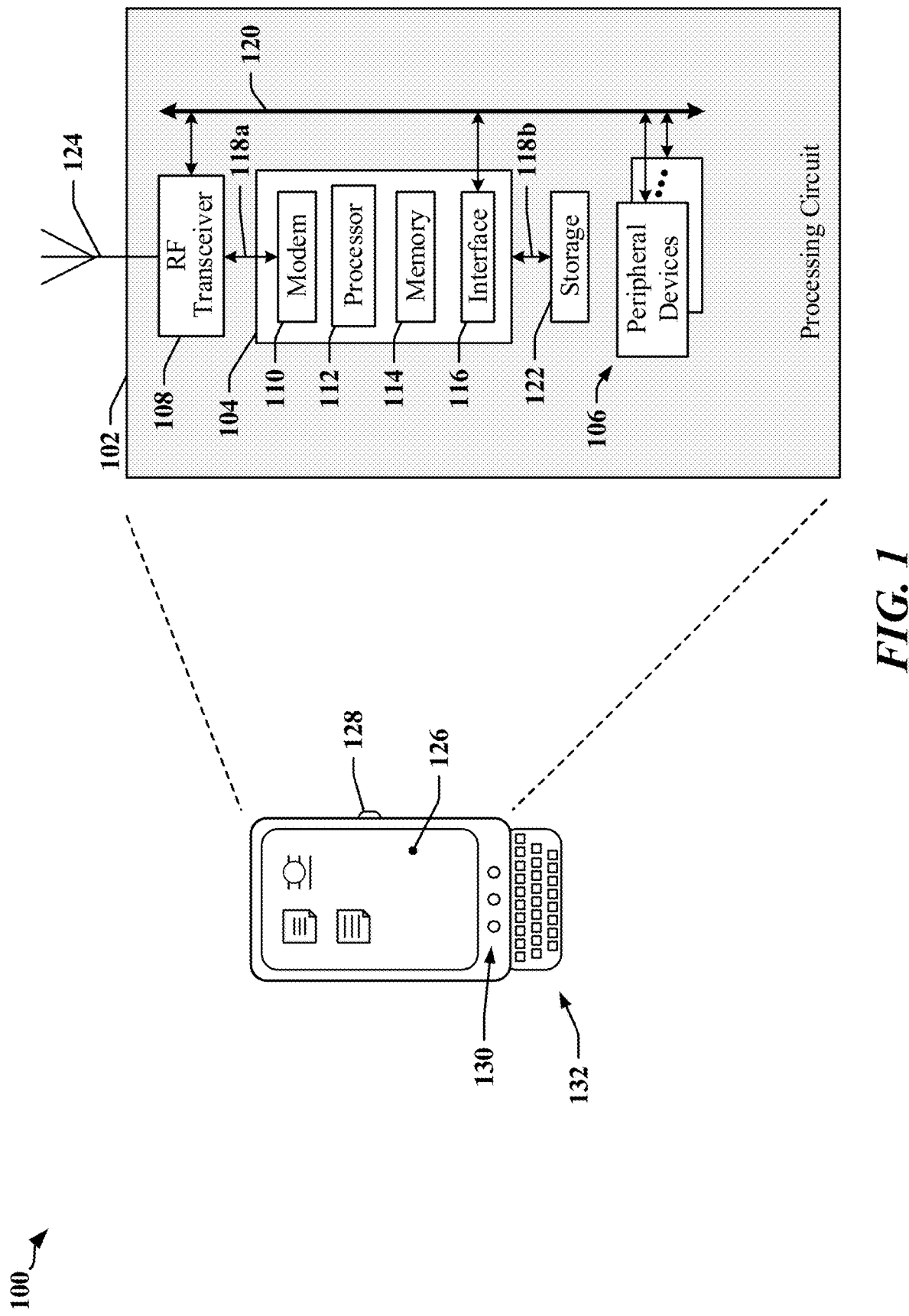
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a shared communication interface that may include a serial bus or other data communication link to connect processors with modems and other peripherals. The serial bus or other data communication link may be operated in accordance with multiple standards or protocols defined. For example, the serial bus may be operated in accordance with an I2C, I3C, SPMI, and/or RFFE protocol, or other protocol that may be configured for half-duplex operation. Increased functionality and complexity of operations involving devices coupled to serial buses, together with the imposition of more stringent timing constraints in support of applications, peripherals and sensors can result in greater demand on GPIO and communication link throughput.

Certain aspects of the disclosure relate to techniques for communication over a single wire, using pulse-width modulation (PWM) to combine clock and data in the same signal. In one aspect, a bus master may be adapted to communicate with some slave devices over a single wire (data only) and other devices over two wires (data and clock). The protocol controller may signal a type of (one-wire or two-wire) communication based on the configuration of a sequence start condition (SSC) used to initiate a transaction.

Various aspects of the of the SSC are defined by RFFE protocols. The durations of the high portion and the low portion are specified by protocol and the rise and fall times of transitions in the SSC are defined by protocol. Limits on the frequency of the clock signal transmitted on the SCLK line may also be defined by protocol. A protocol controller may be configured to transmit a modified SSC to indicate when a transaction is to be conducted with a one-wire slave device. In certain examples, the protocol controller may transmit an extended-length SSC to target a one-wire slave device for communication. In some implementations, the protocol controller may transmit a shortened SSC to target a one-wire slave device for communication. In some instances, the protocol controller may transmit the SSC with modified rise and fall time to target a one-wire slave device for communication.

In one example a one-wire slave device has an interface circuit adapted to couple the apparatus to a wire of a serial bus, and a processor configured to receive a first SSC from a data wire of a serial bus, the SSC indicating that a first datagram transmitted after the first SSC is to be transmitted concurrently with clock pulses in a clock signal transmitted on a clock line of the serial bus. The processor may be configured to receive a second SSC from the data wire, the second SSC indicating that a second datagram transmitted after the second SSC is to be transmitted with embedded clock information in a data signal. The processor may be configured to ignore the first datagram and demodulate the data signal to extract the second datagram. The apparatus may have a pulse-width modulation decoder, and/or a phase modulation decoder configured to demodulate the data signal.

Certain aspects disclosed herein may be usable to replace or supplement a serial bus protocol, such as an I2C, I3C, SPMI, and/or RFFE protocol, or point-to-point interfaces based on UARTs, line-multiplexed UARTs (LM-UARTs). Certain aspects are applicable to a serial bus operated in half-duplex mode or full-duplex mode. Certain aspects are applicable to point-to-point interfaces including UART-based interfaces, line multiplexed UART (LM-UART) interfaces. In some implementations, certain aspects disclosed herein may be deployed to support exchange of virtual GPIO (VGI) messages. Certain aspects are applicable to multipoint interfaces and/or interfaces operated in point-to-point mode.

Examples of Apparatus that Employ Serial Data Links

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include an SoC a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
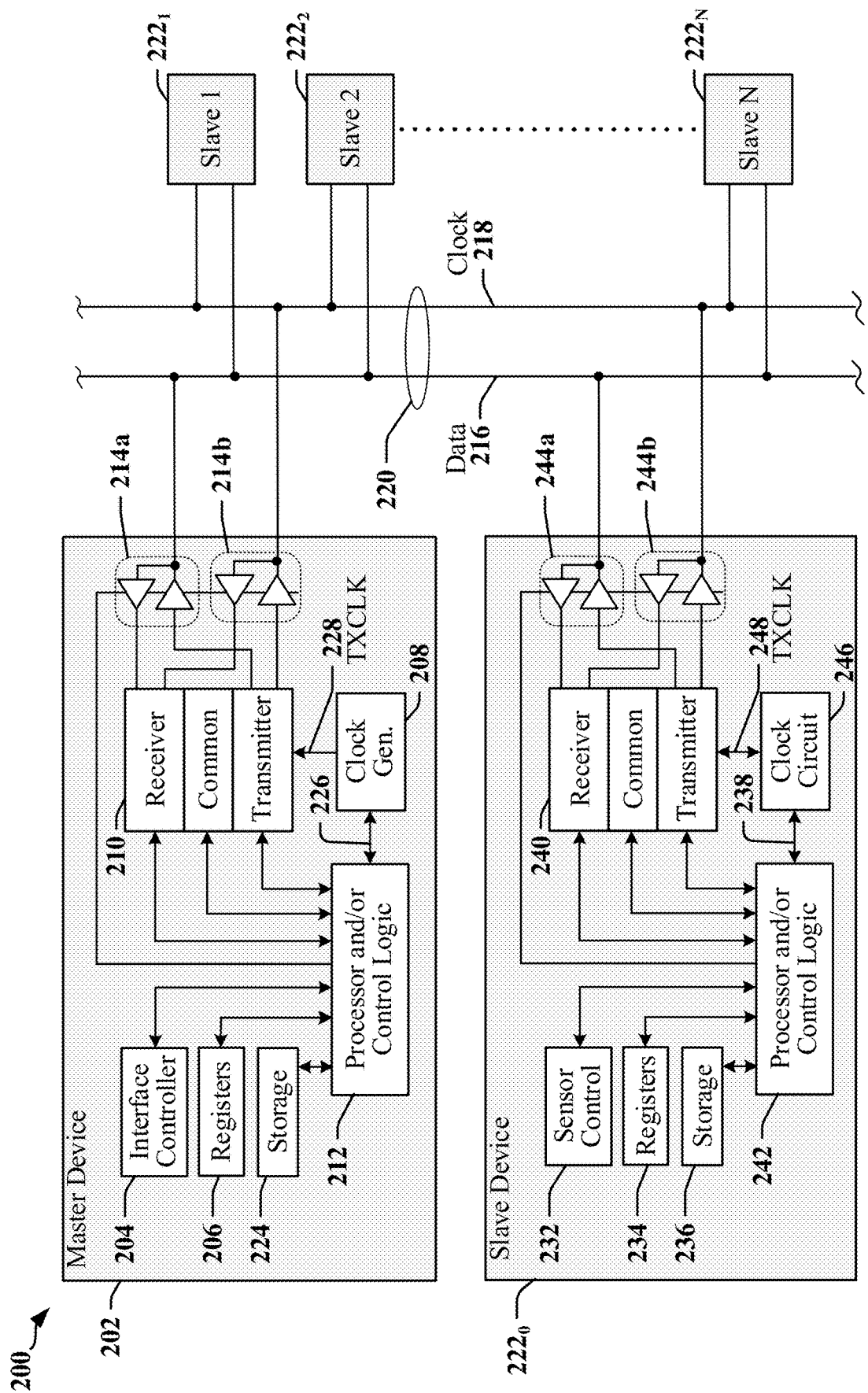
FIG. 2 illustrates a system architecture for an apparatus employing a data link between IC devices.

FIG. 2 illustrates certain aspects of an apparatus 200 that includes multiple devices 202, and $222_0$-$222_N$ coupled to a serial bus 220. The devices 202 and $222_0$-$222_N$ may be implemented in one or more semiconductor IC devices, such as an applications processor, SoC or ASIC. In various implementations the devices 202 and $222_0$-$222_N$ may include, support or operate as a modem, a signal processing device, a display driver, a camera, a user interface, a sensor, a sensor controller, a media player, a transceiver, RFFE devices and/or other such components or devices. In some examples, one or more of the slave devices $222_0$-$222_N$ may be used to control, manage or monitor a sensor device. Communication between devices 202 and $222_0$-$222_N$ over the serial bus 220 is controlled by a master device 202. Certain types of bus can support multiple master devices 202.

In one example, a master device 202 may include an interface controller 204 that manages access to the serial bus, configures dynamic addresses for slave devices $222_0$-$222_N$ and/or causes a clock signal 228 to be transmitted on a clock line 218 of the serial bus 220. The master device 202 may include configuration registers 206 or other storage 224, and other control logic 212 configured to handle protocols and/or higher level functions. The control logic 212 may include a processing circuit such as a state machine, sequencer, signal processor or general-purpose processor. The master device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clocks 226 may be used by the control logic 212 and other functions, circuits or modules.

At least one device $222_0$-$222_N$ may be configured to operate as a slave device on the serial bus 220 and may include circuits and modules that support a display, an image sensor, and/or circuits and modules that control and communicate with one or more sensors that measure environmental conditions. In one example, a slave device $222_0$ configured to operate as a slave device may provide a control function, module or circuit 232 that includes circuits and modules to support a display, an image sensor, and/or circuits and modules that control and communicate with one or more sensors that measure environmental conditions. The slave device $222_0$ may include configuration registers 234 or other storage 236, control logic 242, a transceiver 240 and line drivers/receivers 244a and 244b. The control logic 242 may include a processing circuit such as a state machine, sequencer, signal processor or general-purpose processor. The transceiver 210 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. The clock signal 248 may be derived from a signal received from the clock line 218. Other timing clocks 238 may be used by the control logic 242 and other functions, circuits or modules.

The serial bus 220 may be operated in accordance with RFFE, I2C, I3C, SPMI, or another protocol. At least one device 202, $222_0$-$222_N$ may be configured to selectively operate as either a master device or a slave device on the serial bus 220. Two or more devices 202, $222_0$-$222_N$ may be configurable to operate as a master device on the serial bus 220.

In some implementations, the serial bus 220 may be operated in accordance with an I3C protocol. Devices that communicate using the I3C protocol can coexist on the same serial bus 220 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 220, in addition to data formats and aspects of bus control. In some aspects, the I2C and I3C protocols may define direct current (DC) characteristics affecting certain signal levels associated with the serial bus 220, and/or alternating current (AC) characteristics affecting certain timing aspects of signals transmitted on the serial bus 220. In some examples, a 2-wire serial bus 220 transmits data on a data line 216 and a clock signal on the clock line 218. In some instances, data may be encoded in the signaling state, or transitions in signaling state of the data line 216 and the clock line 218.

Figure 3:
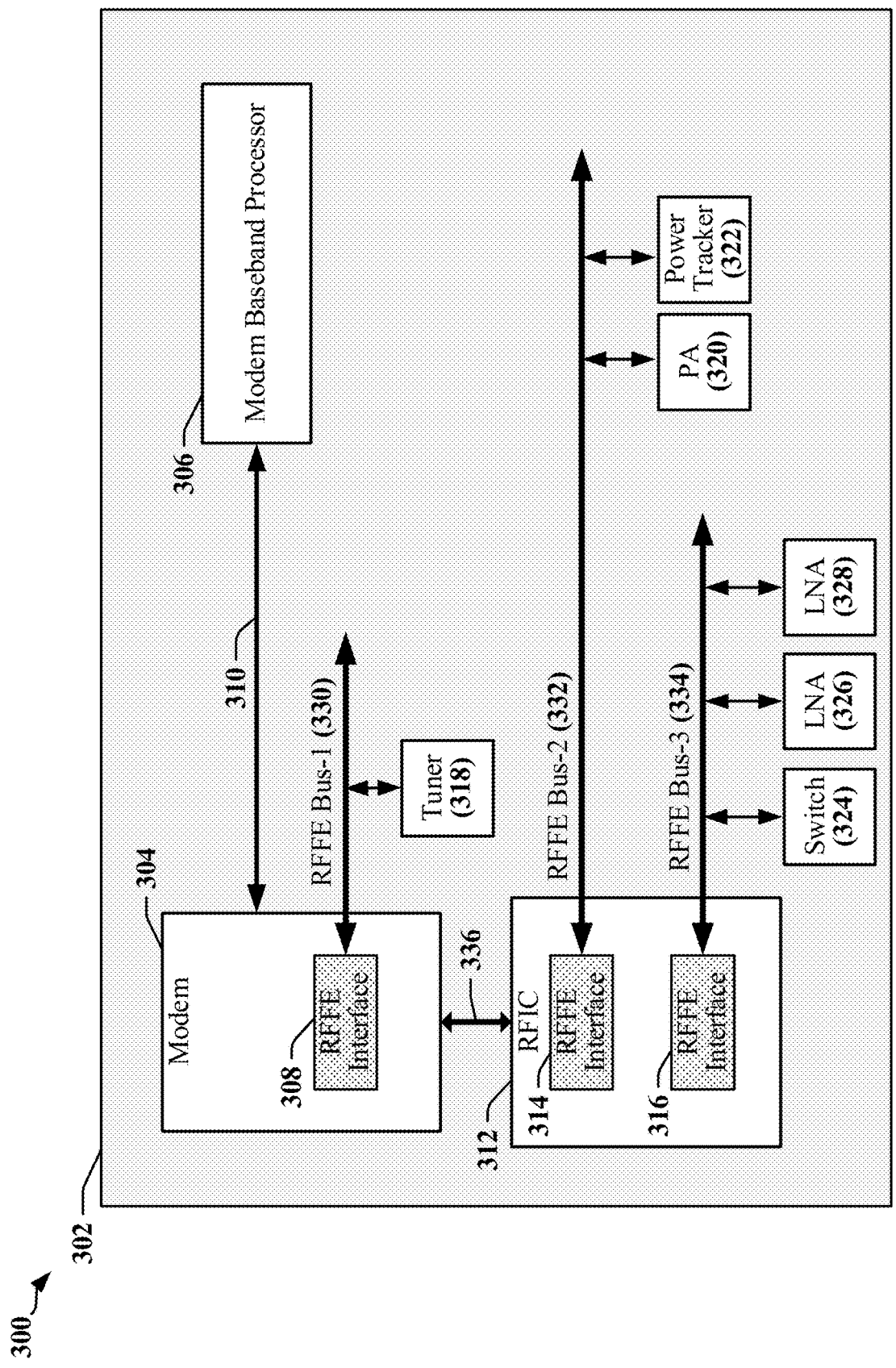
FIG. 3 illustrates a device configuration for coupling various radio frequency front-end devices using multiple RFFE buses.

FIG. 3 is a diagram 300 illustrating an example of a configuration of communication links in a chipset or device 302 that employs multiple RFFE buses 330, 332, 334 to couple various RF front-end devices 318, 320, 322, 324, 326 328. In this example, a modem 304 includes an RFFE interface 308 that couples the modem 304 to a first RFFE bus 330. The modem 304 may communicate with a baseband processor 306 and a Radio-Frequency IC (RFIC 312) through respective communication links 310, 336 or, in some implementations, through a common communication link 310 or 336. The illustrated device 302 may be embodied in one or more of a mobile communication device, a mobile telephone, a mobile computing system, a mobile telephone, a notebook computer, a tablet computing device, a media player, a gaming device, a wearable computing device, a wearable communication device, an appliance, or the like.

In various examples, the device 302 may be implemented with one or more baseband processors 306, modems 304, RFICs 312, multiple communication links 310, 336, multiple RFFE buses 330, 332, 334 and/or other types of buses. The device 302 may include other processors, circuits, modules and may be configured for various operations and/or different functionalities. In the example illustrated in FIG. 3, the modem 304 is coupled to an RF tuner 318 through its RFFE interface 308 and the first RFFE bus 330. The RFIC 312 may include one or more RFFE interfaces 314, 316, controllers, state machines and/or processors that configure and control certain aspects of the RF front-end. In the illustrated example, the RFIC 312 communicates with a PA 320 and a power tracking module 322 through a first of its RFFE interfaces 314 and the second RFFE bus 332. In the illustrated example, RFIC 312 communicates with a switch 324 and one or more LNAs 326, 328 through a second of its RFFE interfaces 316 and the third RFFE bus 334.

Bus latency can affect the ability of a serial bus to handle high-priority, real-time and/or other time-constrained messages. Low-latency messages, or messages requiring low bus latency, may relate to sensor status, device-generated real-time events and virtualized GPIO. In one example, bus latency can be measured as the time elapsed between a message becoming available for transmission and the delivery of the message. In another example, bus latency can be measured as the time elapsed between a message becoming available for transmission and commencement of transmission of the message. Other measures of bus latency may be employed. Bus latency typically includes delays incurred while higher priority messages are transmitted, interrupt processing, the time required to terminate a datagram in process on the serial bus, the time to transmit commands causing bus turnaround between transmit mode and receive mode, bus arbitration and/or command transmissions specified by protocol.

In one example, latency-sensitive messages carry or include coexistence messages. Coexistence messages may be transmitted in a multisystem platform to prevent or reduce instances of certain types of RFFE device impinging on each other. RFFE devices that may be the source or subject of coexistence messages include, for example, switches 324, LNAs 326, 328, PAs 320 and other types of device that operate concurrently in a manner that generates inter-device RF interference, and/or that could potentially cause damage to one or more devices. Coexistence management messages may be exchanged between certain devices that are shared between different radio access technologies, wireless subscriptions and/or applications. For example, a switch 324, LNA 326, 328, PA 320 and/or an antenna may be shared by two different radio access technologies which have different transmit and receive schedules, and damage to an LNA 326, 328 or other device may occur if a device begins transmitting using one radio access technology while receiving using another radio access technology. Devices that can interfere with one another may exchange coexistence management (CxM) messages to permit each device to signal imminent actions that may result in interference or conflict. For example, two modems 304 may exchange CxM messages in order to manage the operation of shared components. In conventional systems CxM messages may be exchanged using dedicated serial links, each implemented using a two-wire or four-wire Universal Asynchronous Receiver/Transmitter (UART). In multi-radio, multi-application systems, the CxM interconnects and other device interconnects can consume large numbers of physical input/output (I/O) pins and interconnects adding to cost and routing complexity.

Multi-drop interfaces such as RFFE, SPMI, I3C, etc. can reduce the number of physical input/output (I/O) pins used to communicate between multiple devices. Protocols that support communication over a multi-drop serial bus define a datagram structure used to transmit command, control and data payloads. Datagram structures for different protocols define certain common features, including addressing used to select devices to receive or transmit data, clock generation and management, interrupt processing and device priorities. In this disclosure, the example of RFFE protocols may be employed to illustrate certain aspects disclosed herein. However, the concepts disclosed herein are applicable to other serial bus protocols and standards.

In accordance with certain aspects disclosed herein, a two-wire serial bus may be adapted to operate alternately in a conventional two-wire mode and for a one-wire mode. In on example, the serial bus may be operated according to RFFE protocols such that the clock and data line are used for communication with two-wire slave devices coupled to the serial bus and the data line is used without a clock signal for communication with one-wire slave devices coupled to the serial bus. The bus master may use pulse-width modulation to encode data transmitted to one-wire slave devices.

Figure 4:
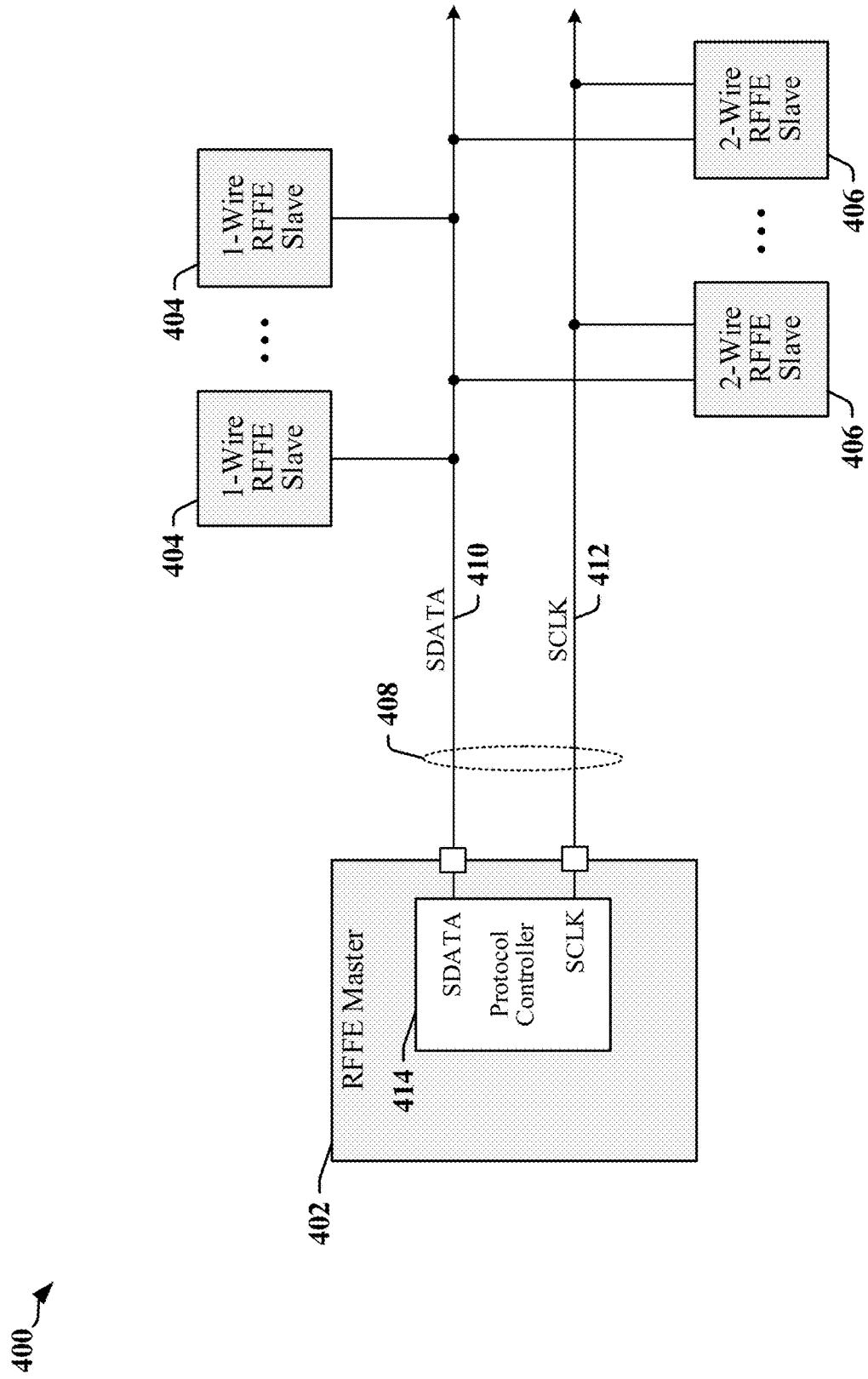
FIG. 4 illustrates a system in which one-wire slave devices and two-wire slave devices coexist in accordance with certain aspects disclosed herein.

FIG. 4 illustrates a system 400 in which one-wire slave devices 404 and two-wire slave devices 406 can coexist, and where a bus master 402 can communicate with both the one-wire slave devices 404 and the two-wire slave devices 406 in accordance with certain aspects disclosed herein. The bus master 402 may be provided in an RFIC, modem, application processor or another type of device. The bus master 402 is coupled to one or more slave devices 404, 406 through at least the SDATA line 410 of a two-wire serial bus 408 that also has an SCLK line 412. Data can be encoded in a data signal transmitted over the SDATA line 410 and, in a 2-Wire mode of communication, a receiver can extract the data using a clock signal transmitted over the SCLK line 412. In the illustrated example, the serial bus 408 is operated in accordance with an RFFE protocol. In other examples, the serial bus 408 may be operated in accordance with another protocol, such as an I3C protocol, SPMI protocol or the like. In the illustrated example, each one-wire slave device 404 and each two-wire slave device 406 is coupled to the SDATA line 410. The one-wire slave devices 404 are adapted for a 1-Wire mode of communication, while the two-wire slave devices 406 are also coupled to the SCLK line 412 to receive the clock signal used in the 2-Wire mode of communication.

The bus master 402 may include a protocol controller 414, which may be implemented by a processing circuit having a processor, controller, state machine or other logic. The protocol controller 414 may be configured to support one or more protocols that can be used to manage operation of the serial bus 408. In some implementations, the protocol controller 414 may be operable to configure one or more slave devices 404, 406. The protocol controller 414 may determine a configuration of a slave device 404, 406 that is a designated recipient of data to be transmitted over the serial bus 408, and may encode data in a signal to be transmitted over the SDATA line 410 accordingly. In some instances, a broadcast message directed to a combination of one-wire slave devices 404 and two-wire slave devices 406 may be sent twice, once in the 1-wire mode of communication and once in the 2-wire mode of communication. The protocol controller 414 may additionally determine whether and/or when a clock signal is to be transmitted over the SCLK line 412. In some implementations, the clock signal is suppressed when data is transmitted in the 1-Wire mode of communication to one or more one-wire slave devices 404.

According to certain aspects disclosed herein, the bus master 402 may select between one-wire slave devices 404 and two-wire slave devices 406 when commencing a transaction. The bus master 402 may use different sequence start conditions (SSCs) to precede one-wire and two-wire transactions. In some implementations, certain interface characteristics of the one-wire slave devices 404 and/or two-wire slave devices 406 may be configurable. For example, a one-wire slave device 404 and/or a two-wire slave device 406 coupled to the serial bus 408 may match a specified bus capacitance when driving the SDATA line 410 based on a configurable register setting that defines the capacitance specified for the SDATA line 410. In other instances, the specified bus capacitance can be hard-wired in the one-wire slave devices 404 and/or two-wire slave devices 406.

Figure 5:
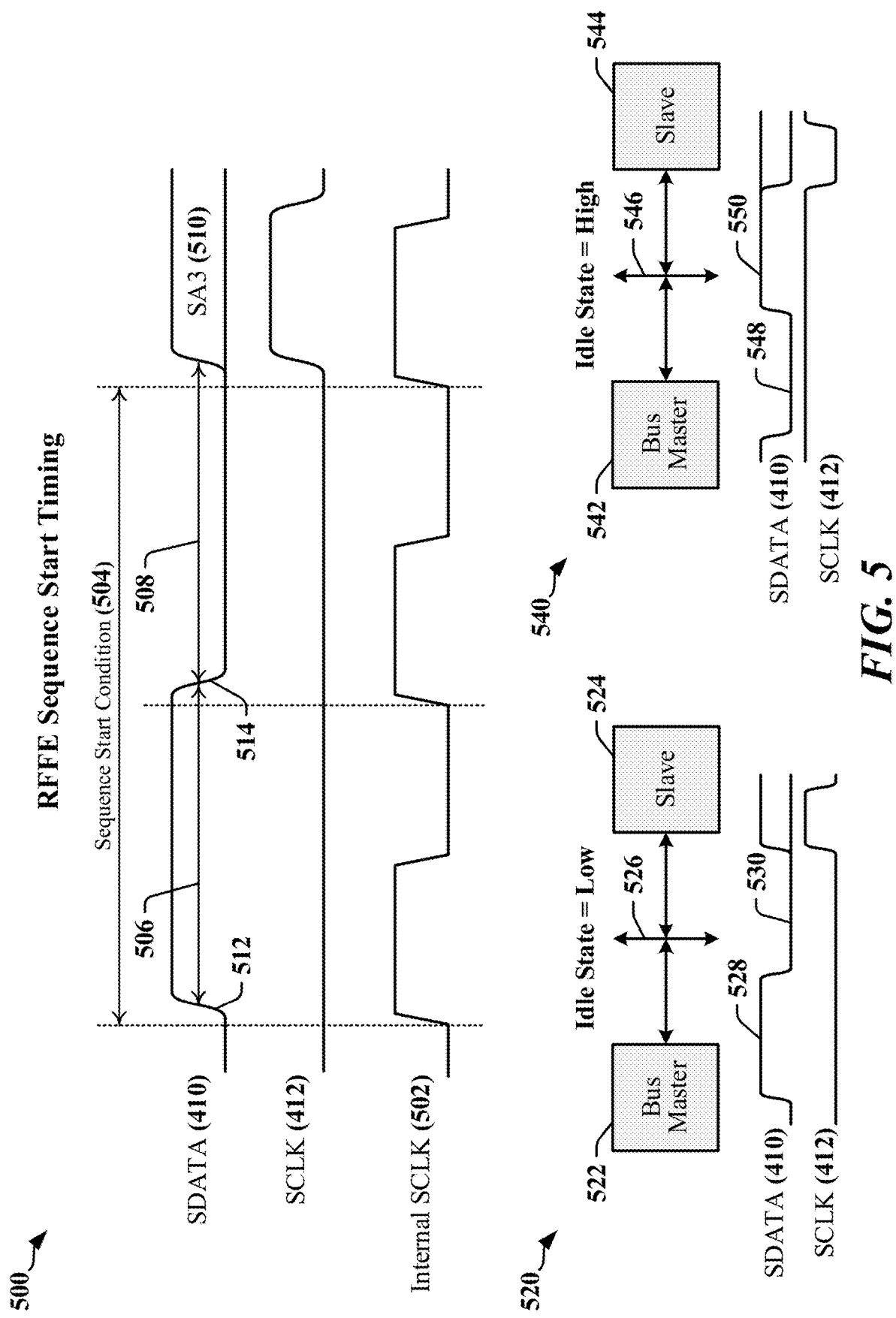
FIG. 5 illustrates a sequence start condition defined by RFFE protocols.

FIG. 5 illustrates RFFE sequence start timing 500 that includes an SSC 504 defined by RFFE protocols. The serial bus 408 is initially in an idle state, where both the SDATA line 410 and the SCLK line 412 are low. A bus master 402 may initiate a transaction by transmitting a two-bit SSC 504. Bit-time, or the transmission time of each bit, may be determined by the frequency of an internal clock 502 used by the bus master 402. The internal clock 502 may be selected to control bitrate of the serial bus 408 during data transmission. The SSC 504 includes a pulse transmitted on the SDATA line 410 while the SCLK line 412 remains low. The pulse includes a one-bit high portion 506 and is followed by a one-bit low portion 508. The SSC 504 may be followed by a slave address 510. In conventional RFFE operation, information bits, including payload data, address and control bits, are sampled or captured when a clock pulse is provided on the SCLK line 412. No clock pulse is provided during transmission of the SSC 504, and a receiving device recognizes that the transitions in signaling state on the SDATA line 410 indicate control signaling when the SCLK line 412 remains low.

Various aspects of the SSC 504 are defined by RFFE protocols, including the durations of the high portion 506 and the low portion 508 of the SSC 504. The rise time ($T_R$) of the leading transition 512 and the fall time ($T_F$) of the pulse-terminating transition 514 are also defined by protocol. Limits on the frequency of the clock signal transmitted on the SCLK line 412 may be defined by design, application, and/or by specifications defining RFFE protocols. A protocol controller 414 may be configured to transmit a modified SSC that indicates when a transaction is to be conducted with a one-wire slave device 404. In certain examples, the protocol controller 414 may transmit an extended-length SSC to target a one-wire slave device 404 for communication and/or to indicate that the transaction is to be conducted in a 1-Wire mode of communication, where the extended-length SSC has a duration that is greater than the duration of an SSC pulse provided in accordance with RFFE specifications. In some implementations, the protocol controller 414 may transmit a shortened SSC to target a one-wire slave device 404 for communication, where the shortened SSC includes a pulse with a duration that is less than the duration of an SSC pulse provided in accordance with RFFE specifications. In some instances, the protocol controller 414 may transmit an SSC with modified rise time and/or fall time to target a one-wire slave device 404 for communication.

According to certain aspects disclosed herein, RFFE datagrams may be transmitted to one-wire slave devices 404 in certain time intervals and to the two-wire slave devices 406 in other time intervals, where the time intervals may be provided in accordance with a time division duplex (TDD) scheme. The TDD scheme may be implemented in an informal manner or, in busy systems for example, a formalized time-sharing scheme may be implemented. Datagrams exchanged between the bus master 402 and the one-wire slave devices 404 are expected to be ignored by the two-wire slave devices 406. Datagrams exchanged between the bus master 402 and the two-wire slave devices 406 are expected to be ignored by the one-wire slave devices 404.

According to certain aspects, legacy two-wire datagrams are identified by a conventional SSC 504 that indicates that signaling is to be provided on both the SDATA line 410 and the SCLK line 412. One-wire datagrams may be identified by an SSC that includes a unique pulse timing signature on the SDATA line 410. In one example, a unique pulse timing signature is provided when the SSC pulse has a duration guaranteed to exceed the high portion 506 of the conventional SSC 504 (the pulse duration). In another example, the unique pulse timing signatures include transitions with modified rise time ($T_R$) and fall time ($T_F$), where receivers are equipped with slope detection circuits. In various implementations, a modified SSC for one-wire datagrams provides timing and/or control information that configures a receiver for the modulation scheme used on the SDATA line 410. In one example, the modified SSC for one-wire datagrams indicates the duration of a bit interval and/or the center point of the bit interval. In some examples, signaling in a clock period that follows the modified SSC indicates the duration of the bit interval and/or the center point of the bit interval.

In various implementations, the voltage level that defines idle state of the bus may be configurable or may change from implementation to implementation. In some examples, the SDATA line 410 and the SCLK line 412 are at a low voltage (or zero volts) in the idle state, while in others the SDATA line 410 and the SCLK line 412 are at a high voltage level in the idle state. The voltage level of the idle state may define the voltage level of the pulses transmitted in pulse-width modulated data signals, and/or the direction of transitions used to represent data in phase-modulated data signals. FIG. 5 includes generalized examples of systems 520, 540 that operate with different idle states. In the first system 520, a bus master 522 communicates with a slave device 524 over a serial bus 526 in which the idle state is defined by a low voltage level 530 while active pulses rise to a higher voltage level 528. The serial bus 526 may be a 1-Wire bus, a 2-Wire bus, or a bus with multiple data lines. In some instances, the number of wires in the serial bus 526 is configurable, and the bus master 522 and slave device 524 may have configurable general-purpose input/output (GPIO) pins that can be configured to match the configuration of the serial bus 526. In some implementations, the bus master 522 and/or the slave device 524 may be have a predefined GPIO configuration. In certain implementations, a bus master 522 may be designed with GPIO pads and/or pins that can support operation in 1-Wire, 2-Wire, or mixed 1-Wire/2-Wire applications.

In the second system 540, a bus master 542 communicates with a slave device 544 over a serial bus 546 in which the idle state is defined by a high voltage level 550 while active pulses fall to a lower voltage level 548. The serial bus 546 may be a 1-Wire bus, a 2-Wire bus, or a bus with multiple data lines. In some instances, the number of wires in the serial bus 546 is configurable, and the bus master 542 and slave device 544 may have configurable general-purpose input/output (GPIO) pins that can be configured to match the configuration of the serial bus 546. In some implementations, the bus master 542 and/or the slave device 544 may be have a predefined GPIO configuration. In certain implementations, a bus master 542 may be designed with GPIO pads and/or pins that can support operation in 1-Wire, 2-Wire, or mixed 1-Wire/2-Wire applications.

Figure 6:
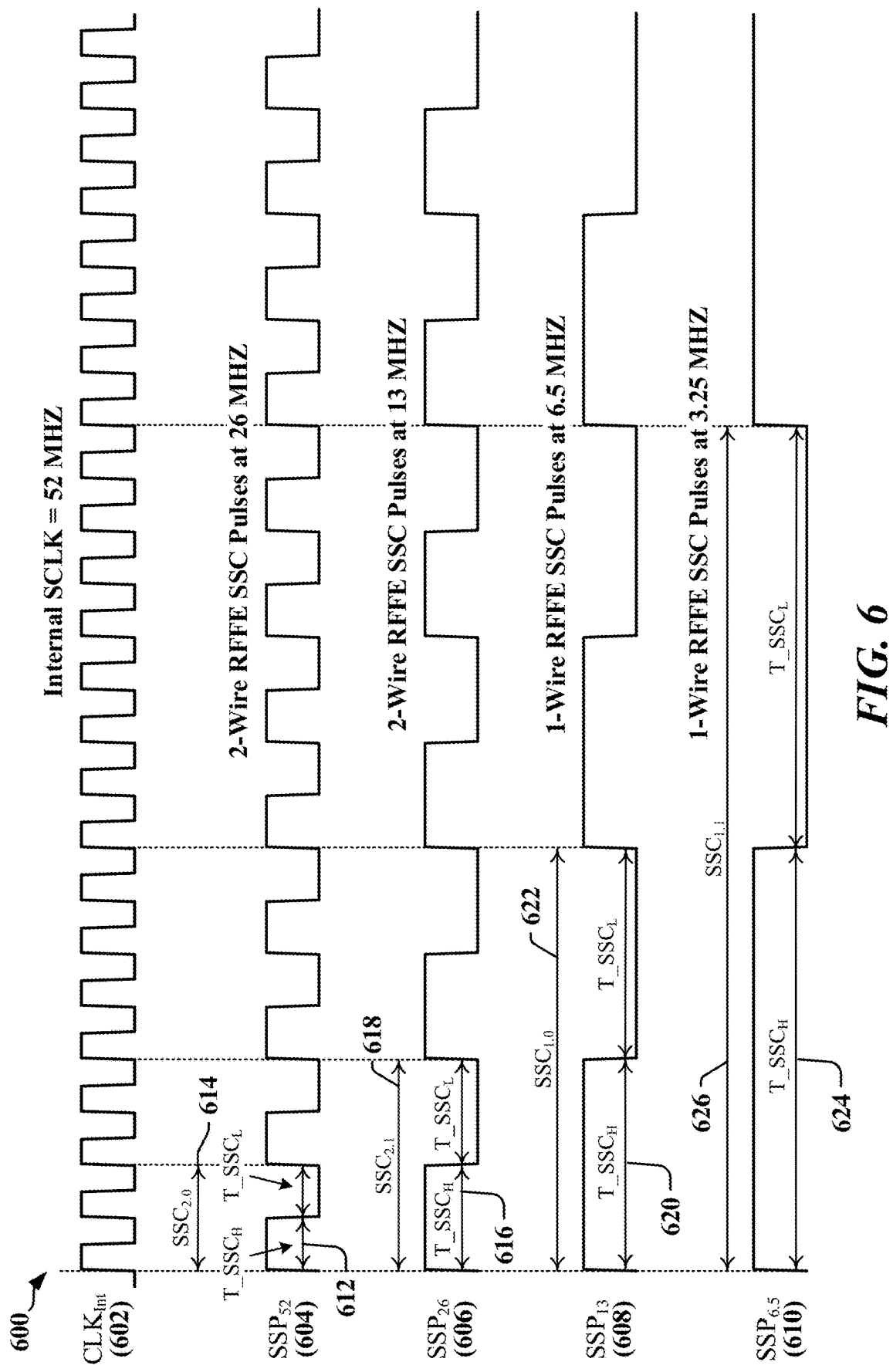
FIG. 6 is a timing diagram that illustrates certain aspects related to the use of a 1-wire SSC in accordance with certain aspects disclosed herein.

FIG. 6 is a timing diagram 600 that illustrates certain aspects related to the use of a 1-wire SSC. For all specified bit rates applicable to one-wire and two-wire RFFE protocol modes, the 1-Wire SSC satisfies the timing relationship governing the duration of SSC pulses:

$$T_{SSC\_HIGH\_1-WIRE} > T_{SSC\_HIGH\_2-WIRE}.$$

In certain implementations, the SSC pulse for a one-wire transaction may be generated by dividing by 4 the frequency of the minimum bit clock for a two-wire transaction. In a first example illustrated in FIG. 6, a 52 MHz internal clock signal 602 may be transmitted on the SCLK line 412 to control two-wire data transfers with a bit rate of 26 MHz. The duration 614 of the SSP corresponds to the period of a pulse-generating clock signal (here, $SSP_{52}$ 604) derived by dividing the internal clock signal 602 by two. In a second example illustrated in FIG. 6, the clock signal transmitted on the SCLK line 412 to control two-wire data transfers is obtained by dividing the 52 MHz internal clock signal 602 by four to provide a 26 MHz (compare with $SSP_{52}$ 604) clock signal on the SCLK line 412. In the second example, the duration 618 of the SSP corresponds to the period of a clock signal (here, $SSP_{26}$ 606) derived by dividing the internal clock signal 602 by four. The first and second examples represent implementations in which the bus master may transmit data at a maximum data rate of 52 MBits/sec and at a minimum data rate of 26 MBits/sec.

According to certain aspects disclosed herein, a first 1-Wire SSC pulse that can be used with the two examples of two-wire data transfers may be obtained by dividing the 52 MHz internal clock signal 602 by eight to provide a data rate of 13 MBits/sec, and the 1-Wire SSC, which has a duration 622 corresponding to the period of a clock signal (here, SSP$_{13}$ 608) with a frequency of 6.5 MHz. The duration 622 of the first 1-Wire SSC is at least double the duration of the shortest 2-wire SSC.

A second 1-Wire SSC pulse that can be used with the two examples of two-wire data transfers may be obtained by dividing the 52 MHz internal clock signal 602 by sixteen to provide a data rate of 6.5 MBits/sec, and the second 1-Wire SSC, which has a duration 626 corresponding to the period of a clock signal (here, SSP$_{6.5}$ 608) with a frequency of 3.25 MHz. The duration 626 of the second 1-Wire SSC is at least four times the duration of the shortest 2-Wire SSC.

In some implementations, the 1-Wire SSC may be generated using other clock divide ratios. For example, the 2-Wire SSC in the first example illustrated in FIG. 6 is generated by dividing the 52 MHz internal clock signal 602 by two to produce a pulse on the SDATA line 410. In some instances, a 1-wire SSC may be provided with a pulse width of three periods of the 52 MHz internal clock signal 602. This latter 1-Wire SSC has a pulse duration that is greater than the pulse widths 612, 616 of either of the 2-Wire communication examples, which have SSC pulse widths 612, 616 corresponding to one period and two periods of the 52 MHz internal clock signal 602, respectively. In some instances, the variation between maximum and minimum data rates for 2-Wire communication may be sufficiently limited to enable the use of a 1-Wire SSC that has a pulse width of less than three periods of the 52 MHz internal clock signal 602, but greater than the maximum duration of any possible 2-Wire SSC.

Figure 7:
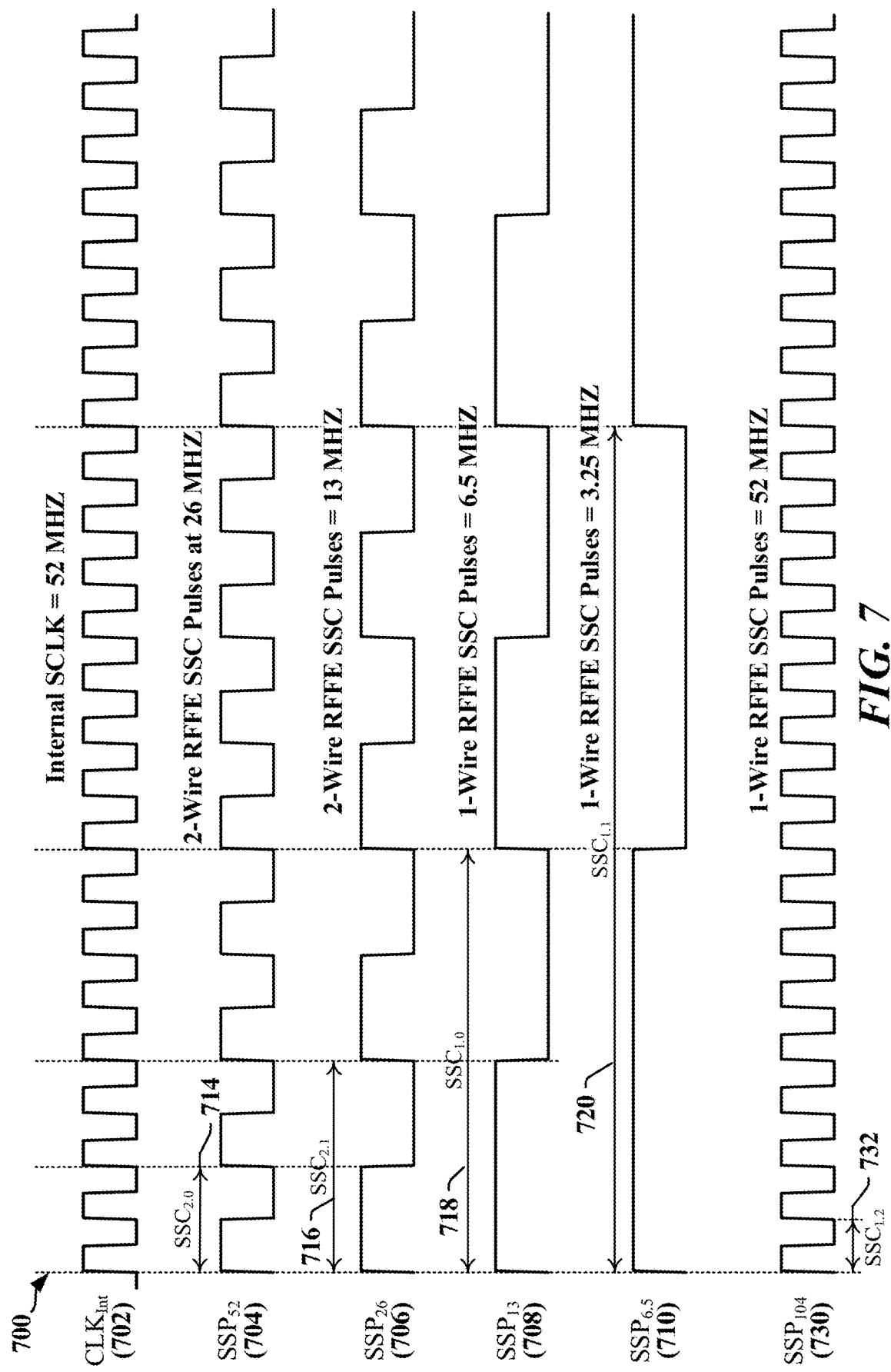
FIG. 7 illustrates an example of a 1-wire SSC that has duration shorter than the durations of corresponding 2-wire SSCs in accordance with certain aspects disclosed herein.

In another example, a 1-Wire SSC may be provided with a pulse width that is shorter than any 2-Wire SSC. FIG. 7 illustrates an example of a 1-Wire SSC that has duration 732 shorter than the durations 714, 716 of corresponding 2-Wire SSCs. In this example, the 1-Wire SSC has a pulse width of 0.5 periods of the 52 MHz internal clock signal 702, while the corresponding 2-Wire SSC pulses have widths corresponding to one period and two periods of the 52 MHz internal clock signal 702.

In some implementations, the 1-wire SSC pulse be distinguishable from 2-Wire SSCs when the 1-Wire SSC pulse is generated with slower rise time and fall time durations.

In a system 400 in which one-wire slave devices 404 and two-wire slave devices 406 coexist on a serial bus 408, a current mode of communication can be indicated by the type of SSC transmitted to commence a transaction. A 1-Wire SSC is transmitted to indicate to one or more one-wire slave devices 404 that a one-wire transaction follows. In certain implementations, the one-wire transaction is conducted using PWM encoding. The bus master 402 refrains from transmitting pulses in a clock signal on the SCLK line 412 during one-wire transactions. Two-wire slave devices 406 ignore information transmitted on the SDATA line 410 when clock pulses are not provided on the SCLK line 412 (with the exception of valid 2-Wire SSCs), and the two-wire slave devices 406 ignore the one-wire transaction. A 2-Wire SSC is transmitted to indicate to one or more two-wire slave devices 406 that a two-wire transaction follows. In certain implementations, the two-wire transaction is conducted in accordance with conventional RFFE protocols. One-wire slave devices 404 do not recognize the 2-Wire SSC and may be configured to ignore transitions on the SDATA line 410 during the 2-Wire transaction.

In some implementations, the one-wire slave devices 404 have timing sources that are slower in frequency than the timing source in the bus master 402. In some instances, the bus master 402 and the one-wire slave devices 404 are provided with timing sources in that are commensurate to ensure that the one-wire slave devices 404 can recognize the higher-speed signals transmitted by the bus master 402 on the SDATA line 410.

Figure 8:
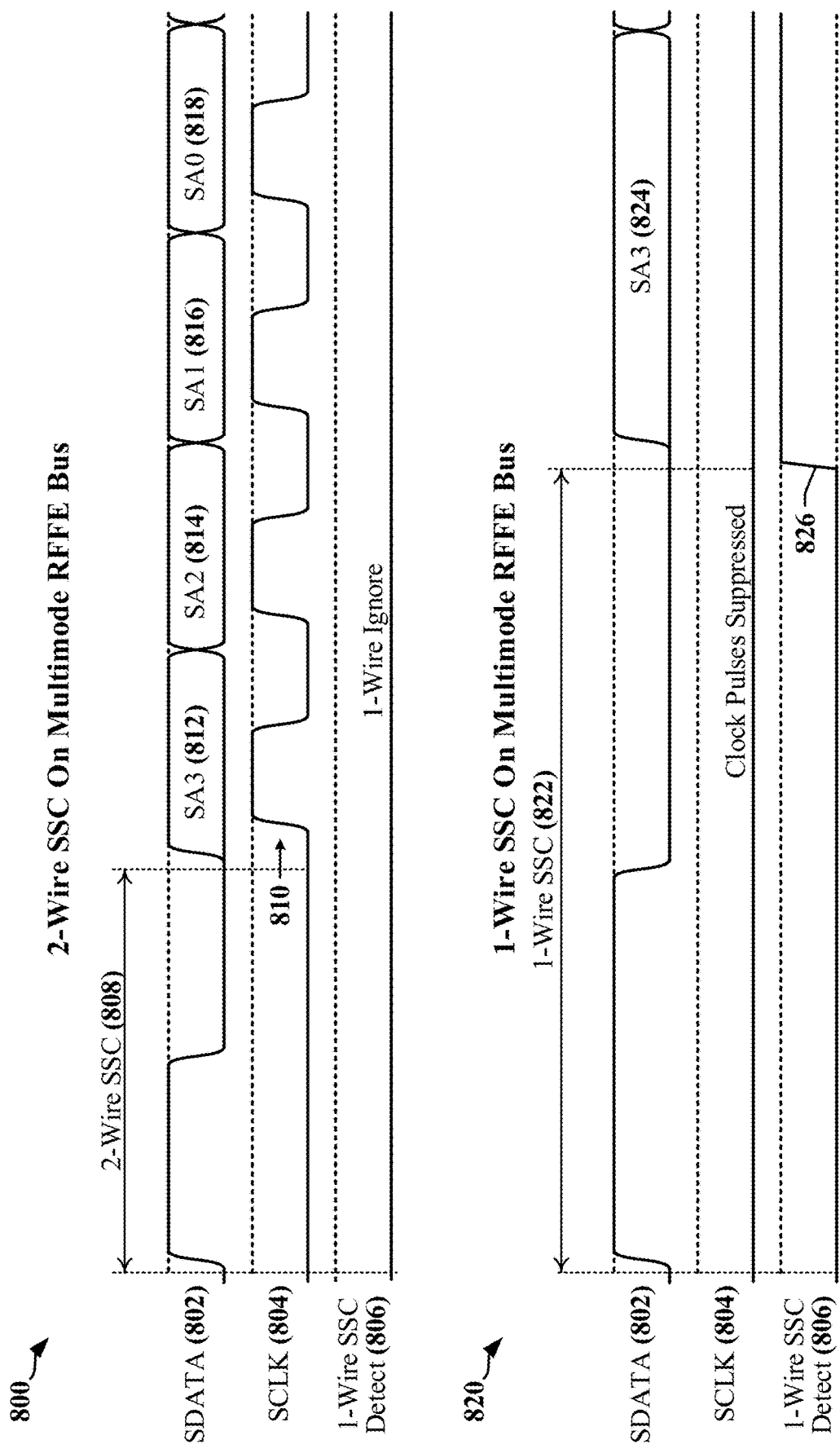
FIG. 8 illustrates examples of transactions conducted on a multi-mode serial bus in accordance with certain aspects disclosed herein.

FIG. 8 illustrates examples 800, 820 of transactions conducted on a multi-mode serial bus. In the first example 800, a 2-Wire SSC 808 is transmitted by the bus master. The bus master then transmits pulses 810 on the SCLK line 804 that indicate and/or differentiate data bits on the SDATA line 802. In the first example 800, a datagram is transmitted that commences with slave address bits 812, 814, 816, 818. The 2-Wire SSC 808 is shorter in duration than the duration defined for a 1-Wire SSC, causing one-wire slave devices 404 to ignore the slave address bits 812, 814, 816, 818 and any subsequent data transmissions until a valid 1-bit SSC 822 is detected. In some implementations, a line interface circuit in the one-wire slave devices 404 provides a detect signal 806 that indicates whether a 1-Wire SSC has been detected.

In the second example 820, a 1-Wire SSC 822 is transmitted by the bus master. The bus master then gates, suppresses or otherwise refrains from transmitting pulses in the clock signal transmitted over the SCLK line 804. The bus master transmits information on the SDATA line 802. In the second example 820, the information may commence with a PWM-encoded slave address bit 824. Two-wire slave devices 406 may be configured or adapted to ignore the PWM-encoded slave address bit 824 when no pulses are provided on the SCLK line 804. A line interface circuit in the one-wire slave devices 404 provides a transition 826 to active state in the detect signal 806 when the 1-Wire SSC 822 has been detected.

Figure 9:
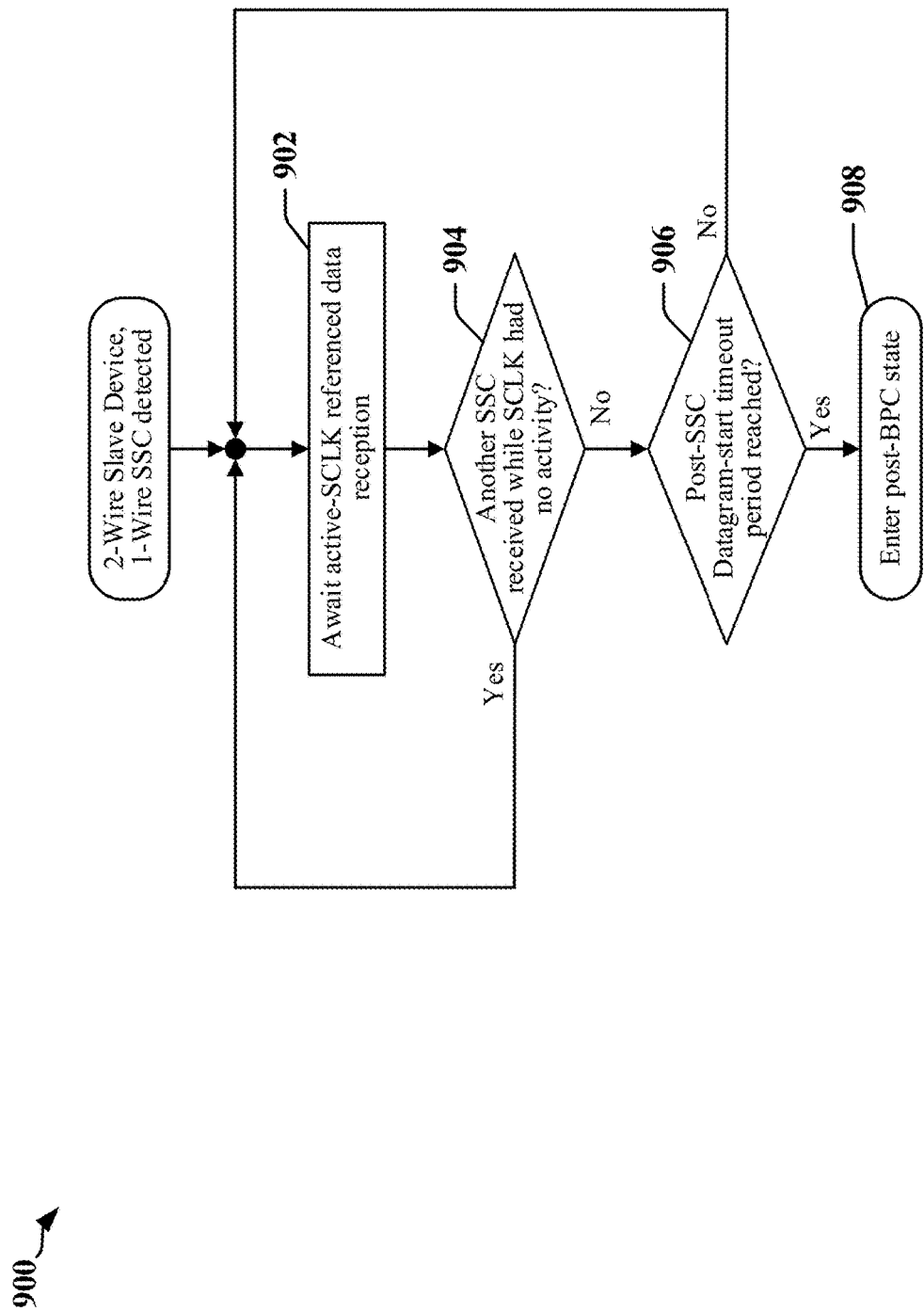
FIG. 9 is a flowchart that illustrates an example in which a 1-wire SSC is detected at a two-wire slave device in accordance with certain aspects disclosed herein.

FIG. 9 is a flowchart 900 that illustrates an example in which a 1-Wire SSC is detected at a two-wire slave device 406. The 1-Wire SSC precedes a 1-Wire transaction that is conducted while pulses on the SCLK line 804 are suppressed. At block 902, the two-wire slave device 406 waits for clock pulses on the SCLK line 804 to capture data from the SDATA line 802. No pulses are received during a 1-Wire transaction. At block 904, the two-wire slave device 406 may determine whether another SSC has been received while waiting for clock pulses on the SCLK line 804. If another SSC has been received, the two-wire slave device 406 may resume or restart waiting at block 902. If another SSC has not been received, the two-wire slave device 406 may determine at block 906 if a post-SSC timeout has expired. The post-SSC timeout may be used to detect failure of a transmitting device to send data after the SSC, or another type of signaling error. When the post-SSC timeout has not expired, the two-wire slave device 406 may continue to wait at block 902. When the post-SSC timeout has expired, the two-wire slave device 404 may return to an idle state at block 908. The idle state may correspond to the state of the two-wire slave device 404 after a bus park cycle (BPC) is transmitted to terminate a normal 2-Wire transaction.

Figure 10:
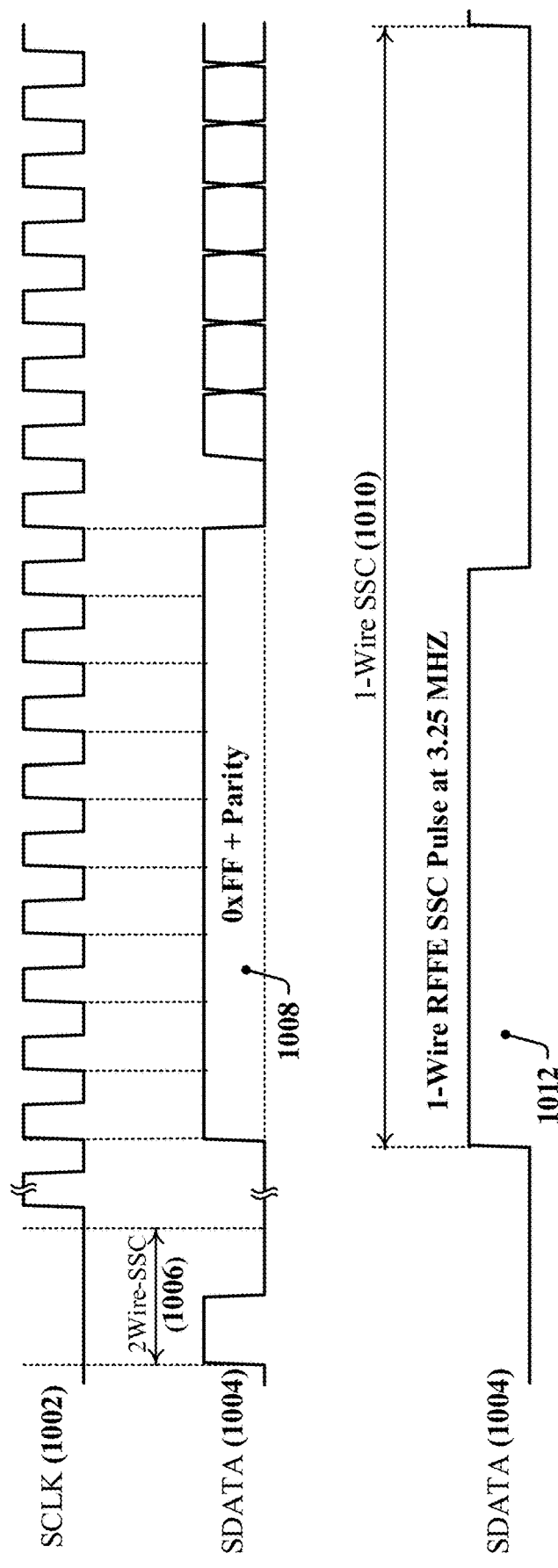
FIG. 10 illustrates an example in which a false 1-wire SSC is transmitted on the SDATA line.

In some instances, a one-wire slave device 404 may detect a false 1-Wire SSC while a 2-Wire transaction is in progress. FIG. 10 illustrates an example 1000 in which a false 1-Wire SSC 1010 is transmitted on the SDATA line 1004. In this example 1000, a bus master transmits a 2-Wire SSC 1006 on the SDATA line 1004 to initiate a 2-Wire transaction. A clock signal is provided on SCLK 1002. In the course of the transaction, a byte is transmitted with the value 0xFF. A parity bit provides odd parity, resulting in a 9-bit transmission 1008 in which the SDATA line 1004 is in a high state. The 9-bit transmission 1008 meets or exceeds the minimum duration specified for a pulse 1012 of a 1-Wire SSC 1010 transmitted on the SDATA line 1004. The 9-bit transmission 1008 may be considered or referred to as a false 1-Wire SSC.

In some implementations, the one-wire slave devices 404 may be configured or adapted to ignore transmissions on the SDATA line 1004 for a minimum period of time after a 2-Wire SSC 1006 has been detected. In one example, the detect signal 806 (see FIG. 8) produced by a line interface circuit in the one-wire slave devices 404 may be adapted to provide a multi-bit signal indicating when a 1-Wire SSC has been detected, and when a 2-wire SSC has been detected. The line interface circuit may produce a detect signal 806 that inhibits operation of 1-Wire receivers for a configured period of time after a 2-wire SSC has been detected.

Figure 11:
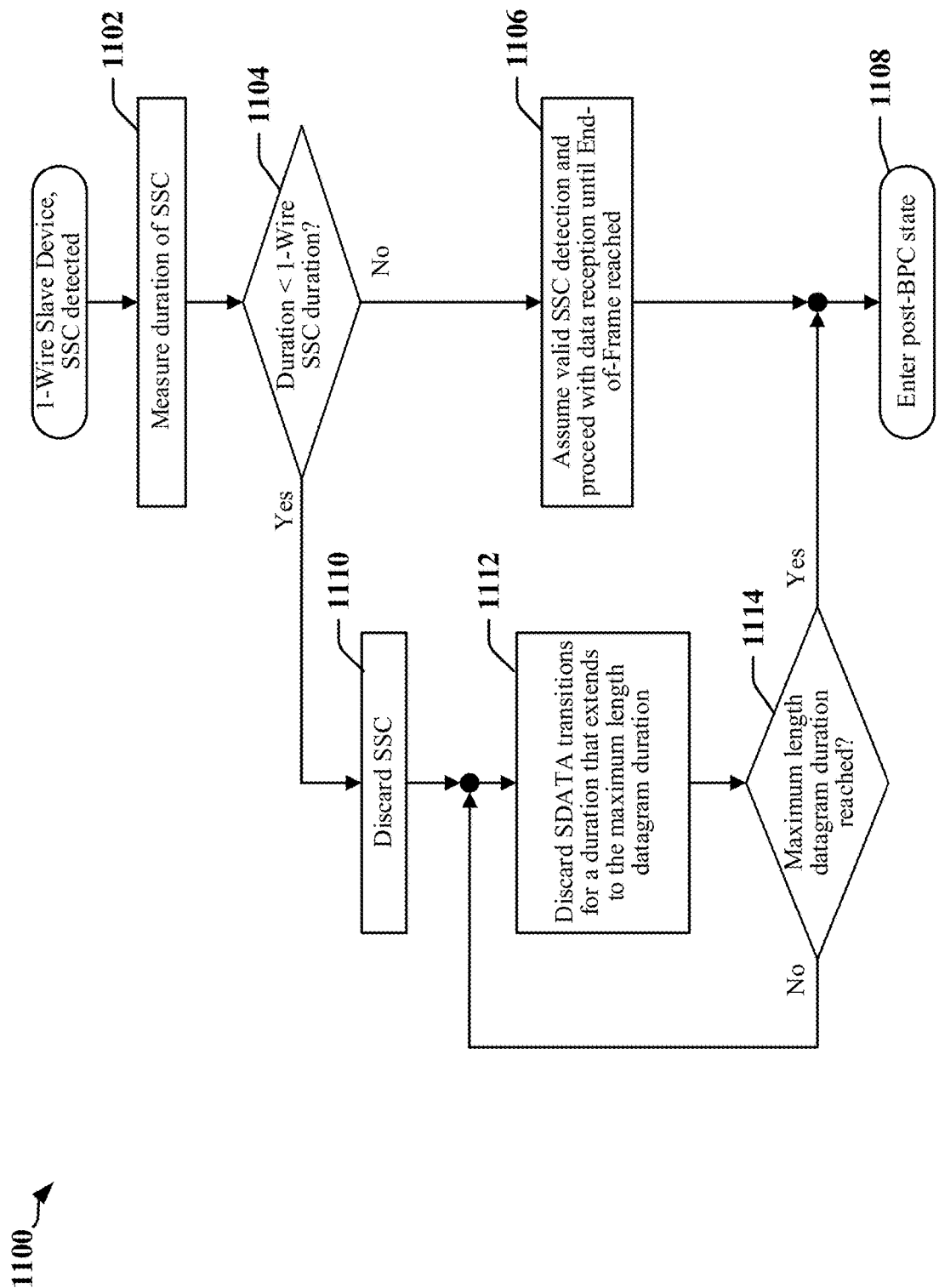
FIG. 11 is a flowchart that illustrates an example in which an SSC is detected at a one-wire slave device adapted to avoid false 1-wire SSC detection in accordance with certain aspects disclosed herein.

FIG. 11 is a flowchart 1100 that illustrates an example in which an SSC is detected at a one-wire slave device 404 adapted to avoid false 1-Wire SSC detection in accordance with certain aspects disclosed herein. At block 1102, the one-wire slave device 404 measures the duration of the SSC. The duration of the SSC may determine whether a 1-Wire or 2-Wire SSC has been received. At block 1104 the one-wire slave device 404 determines which type of SSC has been received. When the duration of the SSC is greater than the maximum duration for a 2-Wire SSC 1006, then the one-wire slave device 404 may proceed with a 1-Wire transaction at block 1106. After completing the transaction at block 1106, the one-wire slave device 404 enters a post-BPC state at block 1108. When the duration of the SSC is less than the minimum duration for a 1-Wire SSC 1010, then the one-wire slave device 404 may discard the SSC at block 1110. At block 1112, the one-wire slave device 404 may ignore and/or discard transitions on the SDATA line 1004 until the one-wire slave device 404 determines at block 1114 that a disable period corresponding to an expected duration of a 2-Wire transaction including the maximum-sized datagram has expired. When the one-wire slave device 404 determines that the disable period has expired, the one-wire slave device 404 enters the post-BPC state at block 1108.

Figure 12:
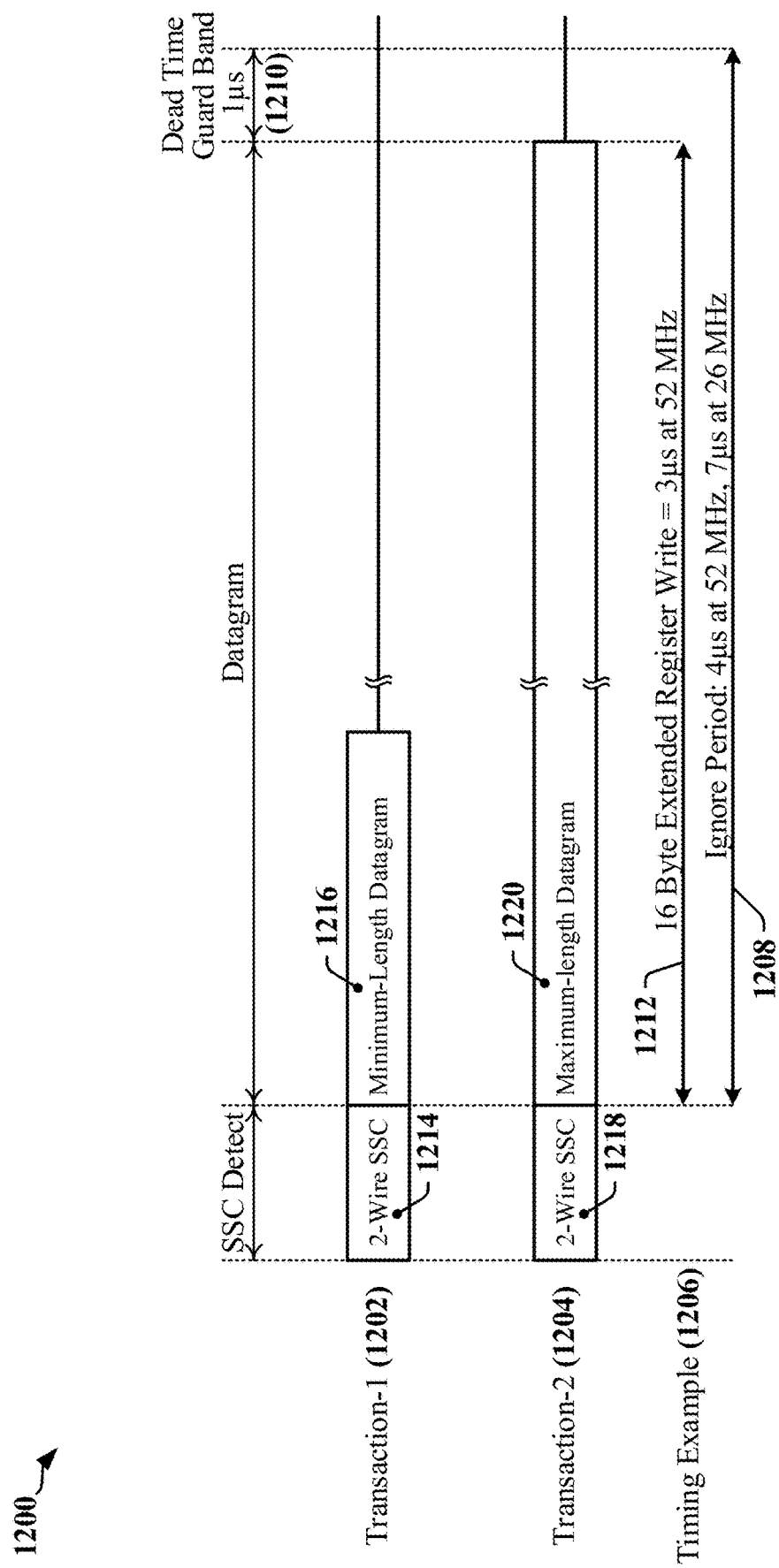
FIG. 12 illustrates timing associated with a disable period used during a 2-wire transaction by a one-wire slave device configured in accordance with certain aspects disclosed herein.

FIG. 12 illustrates timing 1200 associated with a disable period 1208 used during a 2-Wire transaction by a one-wire slave device 404 configured in accordance with certain aspects disclosed herein. Two examples of timing for 2-Wire transaction 1202, 1204 are illustrated in FIG. 12. The duration of the first transaction 1202 includes the duration of a 2-Wire SSC 1214 and a shortest datagram 1216 defined by RFFE protocols. The duration of the second transaction 1204 includes the duration of a 2-Wire SSC 1218 and a maximum-length datagram 1220 defined by RFFE protocols. The disable period 1208 includes the duration of the second transaction 1204 and a guard band 1210. Timing 1206 for a 2-Wire transaction using a 52 MHz clock signal is illustrated. The duration of the 16-byte extended register write transaction 1212 may be calculated at 3 μs, which may be taken as the maximum-length datagram 1220 in some implementations. The corresponding disable period 1208 is 4 μs, including a 1 μs guard band 1210. When the 2-Wire transaction is conducted using a 26 MHz clock signal, the duration of the 16-byte extended register write transaction may be calculated at 6 μs and the corresponding disable period 1208 is 7 μs, including the 1 μs guard band 1210.

Figure 13:
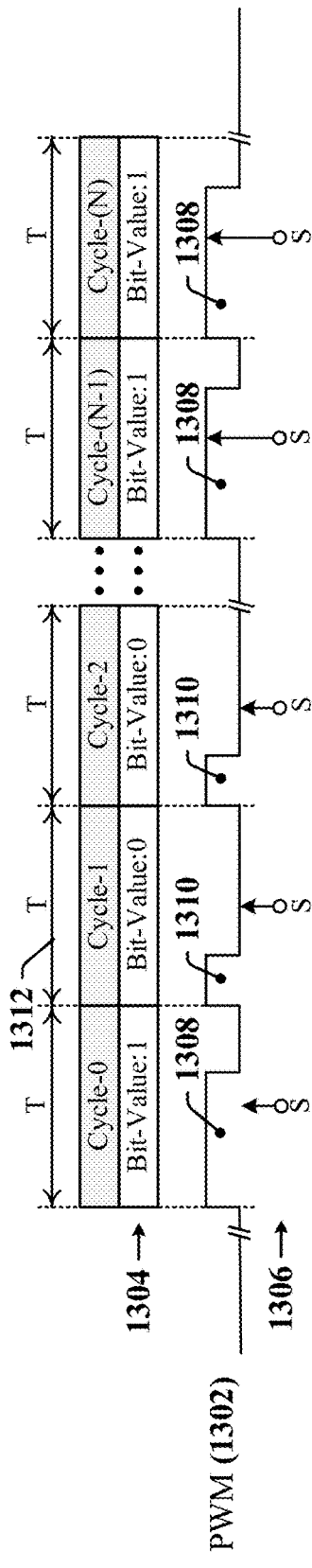
FIG. 13 illustrates two modulation modes that may be used in 1-wire transactions in accordance with certain aspects disclosed herein.
Figure 13:
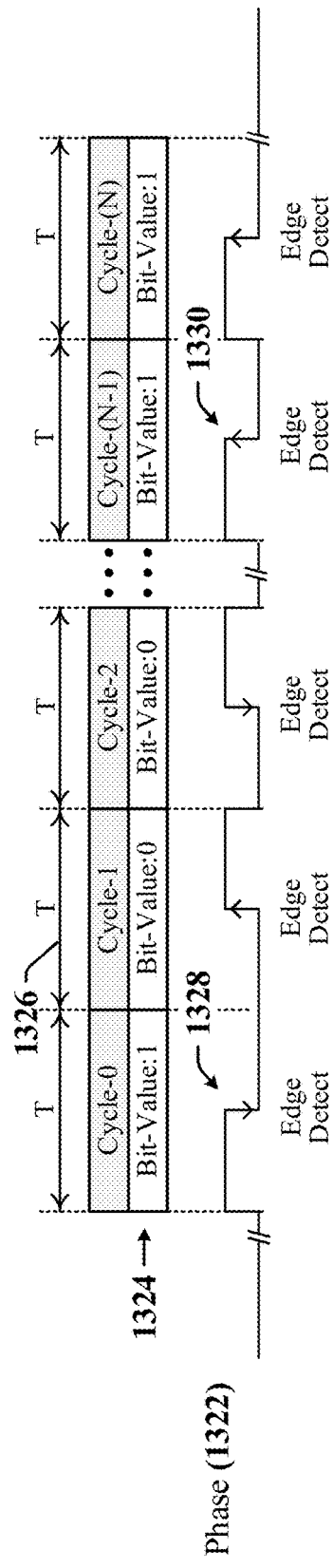

FIG. 13 illustrates two modulation modes 1300, 1320 that may be used in 1-Wire transactions in accordance with certain aspects disclosed herein. According to certain aspects, the 1-Wire SSC is transmitted with a 50% duty cycle and includes a transition at the mid-point. The mid-point transition of the 1-Wire SSC provides explicit timing that can be used to indicate the optimal sampling point and/or the ideal sampling point 1306 and/or generate sampling edges to be used for capturing PWM encoded data 1304. The 1-Wire SSC may provide timing information used to decode phase-modulated data 1324 from a phase-modulated signal 1322.

The first modulation mode 1300 employs pulse-width modulation in which data is encoded in the width of pulses in a PWM signal 1302 transmitted over a wire. The values of bits of the data 1304 are encoded in the width of pulses 1308, 1310 transmitted in the PWM signal 1302. The pulses 1308, 1310 are provided by causing the PWM signal 1302 to transition to a high voltage state for a duration of time referred to herein as pulse width. In the example, a zero-bit value is represented as a short pulse 1310, while a bit having the value '1' is represented as a long pulse 1308. The short pulse 1310 may be defined as a pulse that is less than half the transmission clock period 1312, while the long pulse 1308 may be defined as a pulse that is greater than half the transmission clock period 1312. Accordingly, a receiver may capture data at sampling points 1306 in the middle of each transmission clock period 1312, as identified by the ideal sampling point 1306.

The second modulation mode 1320 employs phase modulation in which data is encoded in the direction of transitions within pulses of a phase-modulated signal 1322 transmitted over a wire. In the illustrated example, data 1324 is encoded in the transitions that occur at, or near the center point of each transmission clock period 1326. A zero-bit value is encoded as a low-to-high transition 1330, while a bit having the value '1' is represented as a high-to-low transition 1328.

The use of a 1-Wire SSC that has a period defined by a multiple of the period of a 2-Wire SSC as a timing reference can limit the data rate attainable when the 1-Wire SSC is used for pulse width modulation and phase modulation in 1-Wire transactions. Decreased data rates can result in increased bus latency that may prevent the serial bus from being used effectively in certain RFFE applications. In certain implementations, and according to certain aspects disclosed herein, timing information for decoding pulse width modulated signals and phase modulated signals may be provided separately from the 1-Wire SSC.

Figure 14:
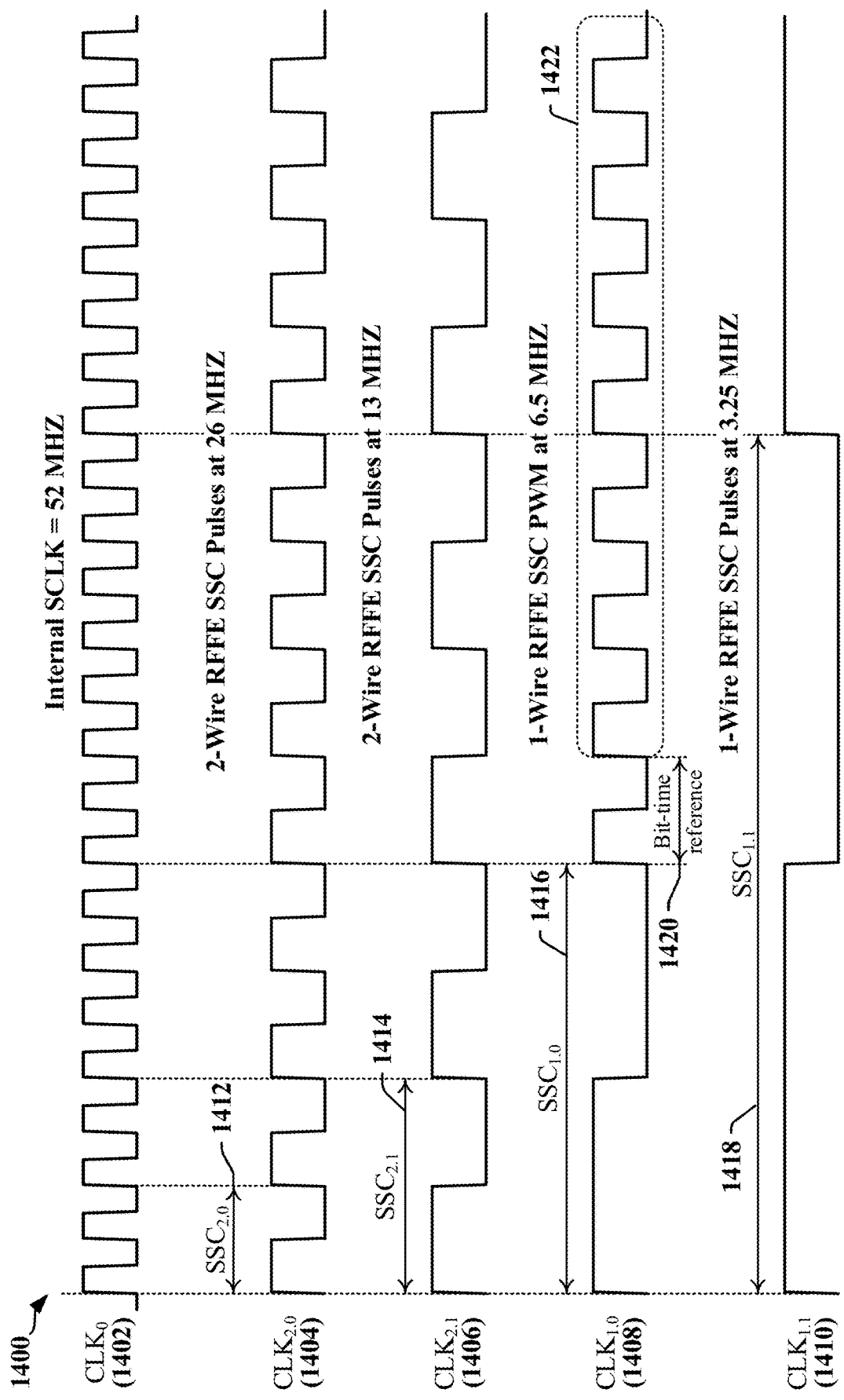
FIG. 14 is a timing diagram that illustrates certain timing aspects of a 1-wire SSC related to decoding pulse width modulated signals and phase modulated signals in accordance with certain aspects disclosed herein.

FIG. 14 is a timing diagram 1400 that illustrates certain aspects related to the provision of timing information after transmission of a 1-Wire SSC, where the timing information configures a receiver that decodes pulse-width modulated signals and phase modulated signals. Certain aspects of the timing diagram 1400 are derived from the timing diagram 600 of FIG. 6, including the timing of the 2-Wire SSCs 1412, 1414 and the 1-Wire SSCs 1416, 1418. The timing diagram 1400 illustrates examples of 1-wire and 2-wire interfaces and corresponding SSC pulse generation using different timing references 1404, 1406, 1408, 1410 derived from an internal clock signal 1402.

In FIG. 14, bit-time reference signaling 1420 provides timing information that may be used for decoding data from the SDATA line. The bit-time reference signaling 1420 may be transmitted in a clock cycle after the 1-Wire SSC 1416. The bit-time reference signaling 1420 may be used to indicate that data bit intervals 1422 are to be provided according to timing in a clock signal that has a different frequency than the clock signal used for generating the 1-Wire SSC pulse. Each of the data bit intervals 1422 can carry one or more bits of data encoded in a PWM signal 1302 or a phase-modulated signal 1322 transmitted in accordance with certain aspects disclosed herein.

Figure 15:
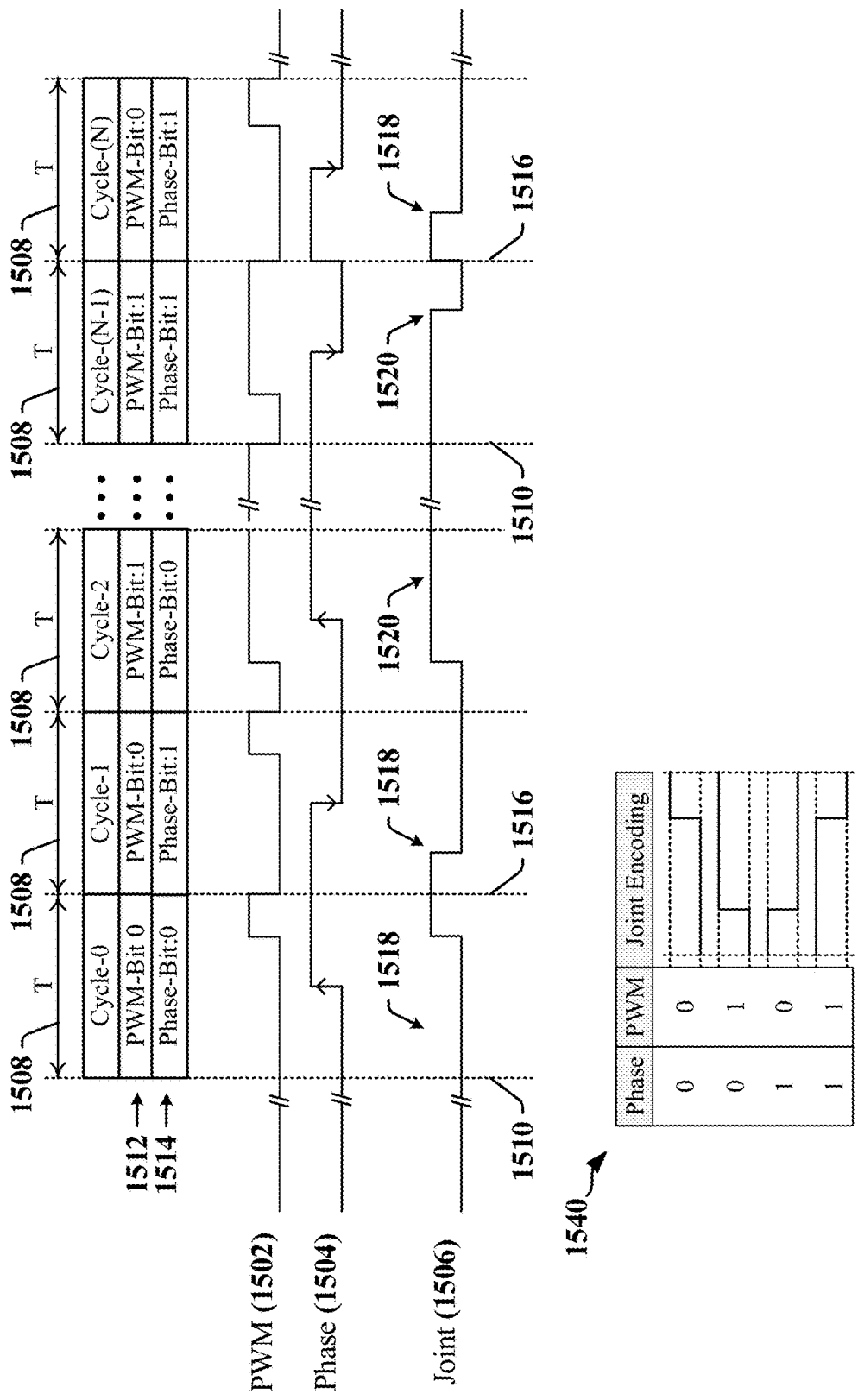
FIG. 15 illustrates a signal that includes PWM-encoded data and Phase-modulated data in accordance with certain aspects disclosed herein.

In some implementations, data rates can be increased using joint PWM and phase-encoding, as illustrated in FIG. 15. The timing diagram 1500 in FIG. 15 illustrates a PWM-encoded signal 1502 that encodes a first set of data bits 1512 and a Phase-modulated signal 1504 that encodes a second set of data bits 1514. The PWM-encoded signal 1502 or the Phase-modulated signal 1504 illustrate the use of the respective modulation techniques to exchange data with a one-wire slave device 404 operated in accordance with certain aspects disclosed herein.

In some implementations, two data bits may be encoded in each transmission clock period 1508. The one-bit PWM modulation and one-bit phase modulation techniques may be combined to provide four signaling patterns for each bit interval. The encoding table 1540 illustrates one example of a mapping of two bits to a jointly encoded signal for transmitting in a bit interval. One bit is used to select phase and one bit is used to select pulse width. The relationship between bit value and phase or pulse width may be defined by configuration. In some instances, a one-to-one relationship between bit value and phase or pulse width may not be discernible, and the four possible signaling patterns may be assigned arbitrarily to represent a two bit binary number (ranging from '00' to '11').

In the illustrated example, a jointly encoded signal 1506 provides a transition 1518, 1520 between the boundaries 1510, 1516 of each transmission clock period 1508. The first set of data bits 1512 may be encoded in the timing of the boundaries 1510, 1516. In the illustrated example, a bit value of '1' in the first set of data bits 1512 causes a transition 1518 that is closer to the boundary 1510 at the start of the transmission clock period 1508, and a bit first set of data bits 1512 having the value '0' causes a transition 1520 that is closer to the boundary 1516 at the end of the transmission clock period 1508. The second set of data bits 1514 defines the direction of transition of the transitions 1518, 1520 provided between the boundaries 1510, 1516 of each transmission clock period 1508. A bit value of '0' in the second set of data bits 1514 is encoded as a low-to-high transition 1518, while a bit in the second set of data bits 1514 having the value '1' is represented as a high-to-low transition 1520.

The use of joint PWM and phase modulation can be used to reduce the time needed to transmit a datagram in a 1-Wire mode of operation. In some implementations, joint PWM and phase modulation may be used to increase the size of data payloads in the 1-Wire mode of operation.

Datagrams for Single Wire Datalinks

Figure 16:
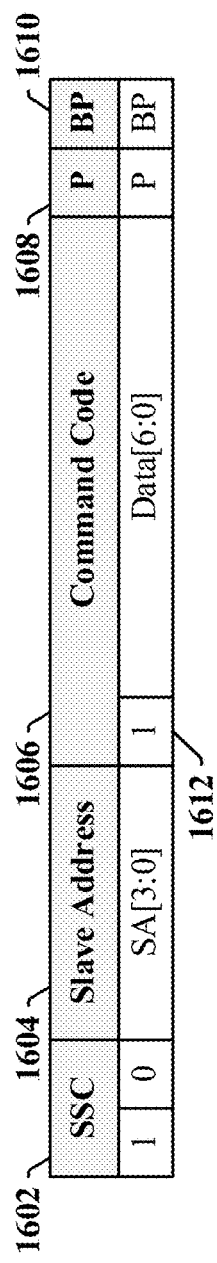
FIG. 16 illustrates datagram structures that may be compliant or compatible with RFFE protocols.
Figure 16:
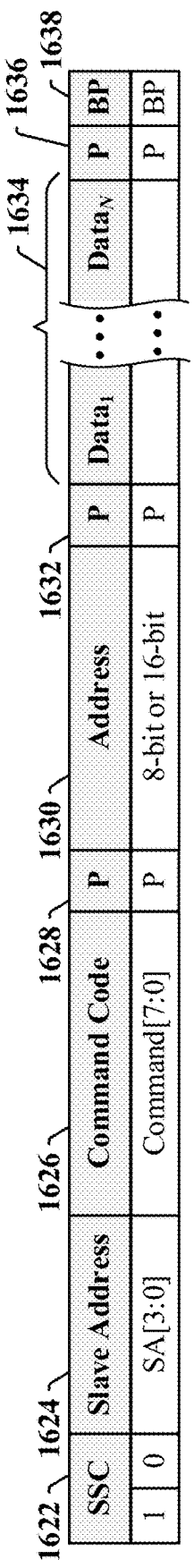

Certain aspects disclosed herein provide optimized protocols that may be used in a hardware-limited datalink. In one example, a protocol based on RFFE protocols can be used to manage and/or control 1-Wire communication over a serial bus that couples two-wire and one-wire slave devices 404, 406. In some implementations, optimized protocols define or redefine datagram structures that support communication between RF front-end devices. FIG. 16 illustrates datagrams 1600, 1620 that may comply, or be compatible with conventional RFFE protocols. The datagrams 1600, 1620 represent Write commands that may be transmitted in datagrams defined by RFFE protocols.

The first datagram 1600 corresponds to a Register 0 Write command that has limited data payload capacity. The datagram 1600 commences with transmission of a two-bit SSC 1602 followed by a slave address 1604 or other device identifier. In the first datagram 1600, the slave address 1604 has four bits. The 8-bit command field 1606 is transmitted next, with the first bit 1612 set to indicate that the command is a Register 0 Write command. The command field 1606 also carries a seven bit data payload. In the first datagram 1600, the command field 1606 may include a parity bit 1608 and may be followed by bus park signaling 1610.

The datagram 1620 represents a generalized Write command that may be transmitted in datagrams defined by RFFE protocols. The datagram 1620 commences with transmission of a two-bit SSC 1622 followed by a four-bit slave address 1624 or another device identifier. The 8-bit command code 1626 is transmitted next. The command code 1626 may be followed by a parity bit 1628. An address field 1630 is transmitted, which can have an 8-bit length or a 16-bit length (for extended register write commands). The address field 1630 may be followed by a parity bit 1632. One or more data frames 1634 may be transmitted, each with an accompanying parity bit 1636. A bus park condition (BPC 1638) terminates the datagram 1620. Each of the data frames 1634 may include an 8-bit byte with parity 1636.

The conventional RFFE bus architecture employs a two-wire bus of two interface lines, including a clock wire (SCLK) and a data wire (SDATA). In certain applications, it may be desirable for one-wire slave devices 404 to communicate through a single-wire of the two-wire bus.

Certain aspects disclosed herein provide a protocol structure that can support reduced speed operation over a single-wire datalink with minimal overhead and reduced transmission latency. The protocols may be used for bidirectional exchange of PWM-encoded data using datagrams that are initiated by 1-Wire SSC. In some implementations, the 1-Wire SSC may provide a sampling timing reference for PWM and/or phase modulation decoding at the receiver. In some implementations, a timing reference transmission follows the 1-Wire SSC to provide a sampling timing reference for PWM and/or phase modulation decoding at the receiver. In some aspects, the RFFE bus may be operable in multiple modes, including conventional 2-wire RFFE modes and 1-wire RFFE modes.

Figure 17:
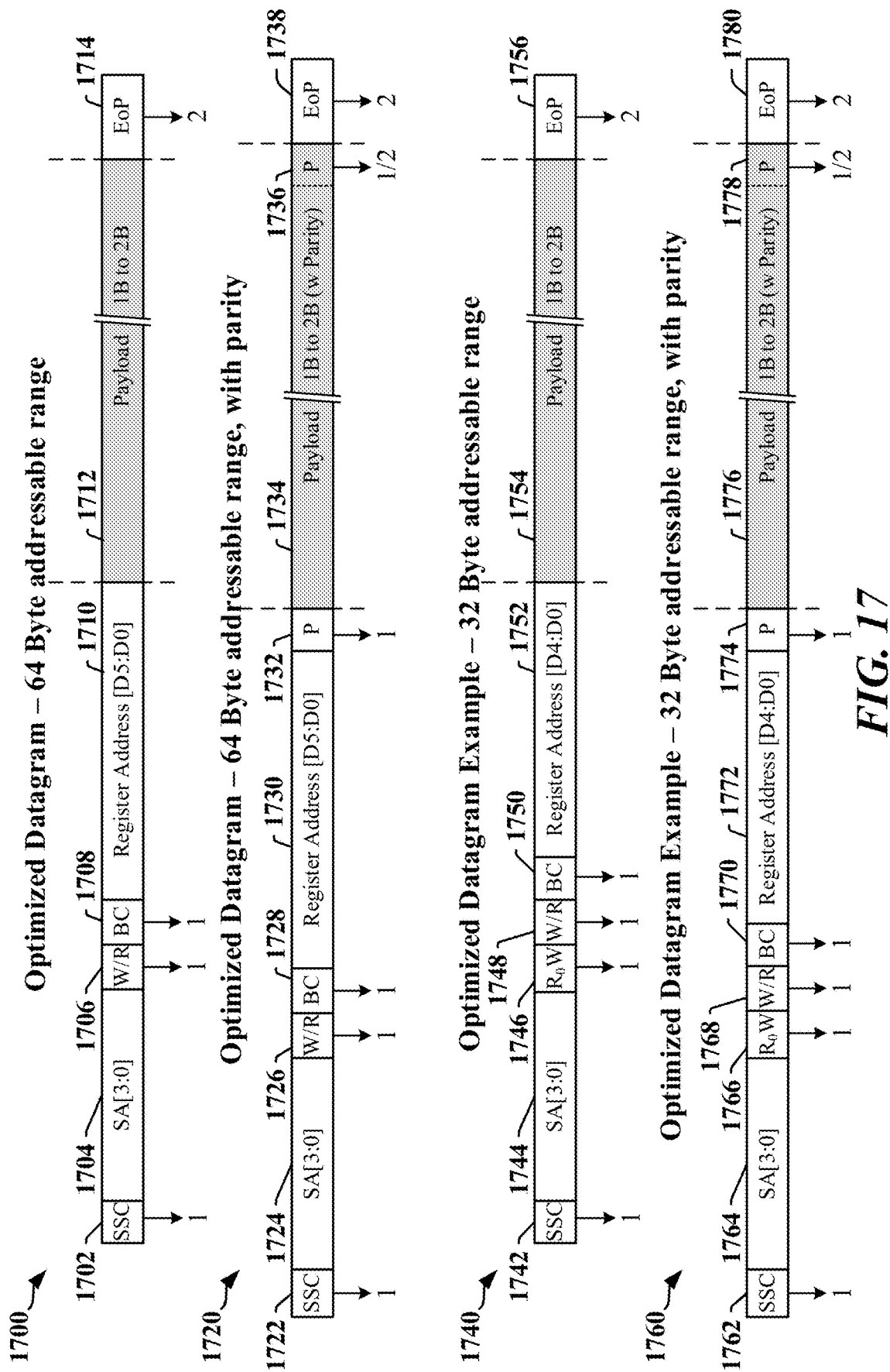
FIG. 17 illustrates examples of datagrams that may be initiated by 1-Wire SSC in accordance with certain aspects disclosed herein.

FIG. 17 illustrates examples of datagrams 1700, 1720, 1740, 1760 that may be initiated by a 1-Wire SSC when a latency-optimized protocol is activated in accordance with certain aspects disclosed herein. The size and configuration of the datagrams 1700, 1720, 1740, 1760 may be determined differently for different applications or implementations. In one example, the configuration and/or meaning of bit fields may vary between applications and/or implementations. In another example, the size of individual fields and/or the overall size of the datagram 1700, 1720, 1740, 1760 may vary between applications and/or implementations.

In FIG. 17, the first datagram 1700 includes a 6-bit register address field 1710 that allows up to 64 registers to be directly addressed. In this example, the 1-Wire SSC 1702 provides timing information that permits decoding of PWM and Phase modulated data. The 1-Wire SSC 1702 may be provided in one clock cycle with a 50% duty cycle. In other examples, it may be desirable to provide an additional bit-time reference after the 1-Wire SSC 1702 to change the clock rate used to transmit data bits. A 4-bit slave address field 1704 may be used to select between one-wire slave devices 404 coupled to the serial bus. The slave address field 1704 may carry a unique slave identifier or a group identifier that selects multiple one-wire slave devices 404. The slave address field 1704 is followed by 1-bit Write/Read indicator 1706, which in a first state indicates a write operation is to be performed at one or more addressed one-wire slave devices 404 and, in a second state, indicates a read operation is to be performed at the one or more addressed one-wire slave devices 404.

In some implementations, a byte count field 1708 is provided. The illustrated byte count field 1708 is a 1-bit field and indicates that the data payload 1712 carries one or two bytes. The byte count field 1708 can be larger to indicate larger payload size, or omitted to indicate a fixed payload size. The meaning of the content of the byte count field 1708 may be defined by configuration. For example, a 1-bit value may select between one or two bytes, no bytes and one byte, two bytes and four bytes, or any combination of payload sizes indicated by configuration. The register address field 1710 follows and may consume the remaining bits of a control field (here 6 bits). In some implementations, the size of the register address field 1710 may be independently defined by configuration base on addressing needs in an application, for example. End of packet signaling such as a 2-bit BPC 1714 follows the data payload 1712.

The second datagram 1720 in FIG. 17 includes a 6-bit register address field 1730 that allows up to 64 registers to be directly addressed. The register address field 1730 is transmitted with a parity bit 1732. In this example, the 1-Wire SSC 1722 provides timing information that permits decoding of PWM and Phase modulated data. The 1-Wire SSC 1722 may be provided in one clock cycle with a 50% duty cycle. In other examples, it may be desirable to provide an additional bit-time reference after the 1-Wire SSC 1722 to change the clock rate used to transmit data bits. A 4-bit slave address field 1724 may be used to select between one-wire slave devices 404 coupled to the serial bus. The slave address field 1724 may carry a unique slave identifier or a group identifier that selects multiple one-wire slave devices 404. The slave address field 1724 is followed by 1-bit Write/Read indicator 1726, which in a first state indicates a write operation is to be performed at one or more addressed one-wire slave devices 404 and, in a second state indicates a read operation is to be performed at the one or more addressed one-wire slave devices 404.

In some implementations, a byte count field 1728 is provided. The illustrated byte count field 1728 is a 1-bit field and indicates that the data payload 1734 carries one or two bytes with additional parity 1736. The byte count field 1728 can be larger to indicate larger payload size, or omitted to indicate a fixed payload size. The meaning of the content of the byte count field 1728 may be defined by configuration. For example, a 1-bit value may select between one and two bytes, no bytes and one byte, two bytes and four bytes, or any combination of payload sizes indicated by configuration. The register address field 1730 follows and may consume the remaining bits of a control field (here 6 bits). The parity bit 1732 may provide odd or even parity as configured and/or based on implementation needs. In some implementations, the size of the register address field 1730 may be independently defined by configuration base on addressing needs in an application, for example. End of packet signaling such as a 2-bit BPC 1738 follows the data payload 1734 and associated parity 1736. The number of bits transmitted as parity 1736 may be defined by the byte count field 1728, where one parity bit is transmitted for each byte in the data payload 1734, for example.

In FIG. 17, the third datagram 1740 may be used as a modified Register-0 Write datagram. The third datagram 1740 includes a 5-bit register address field 1752 that allows up to 32 registers to be directly addressed. In this example, the 1-Wire SSC 1742 provides timing information that permits decoding of PWM and Phase modulated data. The 1-Wire SSC 1742 may be provided in one clock cycle with a 50% duty cycle. In other examples, it may be desirable to provide an additional bit-time reference after the 1-Wire SSC 1742 to change the clock rate used to transmit data bits. A 4-bit slave address field 1744 may be used to select between one-wire slave devices 404 coupled to the serial bus. The slave address field 1744 may carry a unique slave identifier or a group identifier that selects multiple one-wire slave devices 404.

In this example, the slave address field 1744 is followed by a 1-bit Register-0 Write indicator 1746 that can identify the datagram 1740 as a modified Register-0 Write datagram. The modified Register-0 Write datagram may have a predefined structure in which one or more fields and/or bits may be redefined for a specific purpose. The modified Register-0 Write datagram can maximize the amount of data written to high-priority registers, when a low-latency transaction is conducted over the serial bus.

The 1-bit Write/Read indicator 1748 may determine, in a first state that a write operation is to be performed at one or more addressed one-wire slave devices 404 and, in a second state, that a read operation is to be performed at the one or more addressed one-wire slave devices 404.

In some implementations, a byte count field 1750 is provided. The illustrated byte count field 1750 is a 1-bit field and indicates that the data payload 1754 carries one or two bytes. The byte count field 1750 can be larger to indicate larger payload size, or omitted to indicate a fixed payload size. The meaning of the content of the byte count field 1750 may be defined by configuration. For example, a 1-bit value may select between one or two bytes, no bytes and one byte, two bytes and four bytes, or any combination of payload sizes indicated by configuration. The register address field 1752 follows and may consume the remaining bits of a control field (here 5 bits). In some implementations, the size of the register address field 1752 may be independently defined by configuration base on addressing needs in an application, for example. End of packet signaling such as a 2-bit BPC 1756 follows the data payload 1754.

In FIG. 17, the fourth datagram 1760 includes a 5-bit register address field 1772 that allows up to 32 registers to be directly addressed. The register address field 1772 is transmitted with a parity bit 1774. In this example, the 1-Wire SSC 1762 provides timing information that permits decoding of PWM and Phase modulated data. The 1-Wire SSC 1762 may be provided in one clock cycle with a 50% duty cycle. In other examples, it may be desirable to provide an additional bit-time reference after the 1-Wire SSC 1762 to change the clock rate used to transmit data bits. A 4-bit slave address field 1764 may be used to select between one-wire slave devices 404 coupled to the serial bus. The slave address field 1764 may carry a unique slave identifier or a group identifier that selects multiple one-wire slave devices 404.

In this example, the slave address field 1764 is followed by a 1-bit Register-0 Write indicator 1766 that can identify the datagram 1760 as a modified Register-0 Write datagram. The modified Register-0 Write datagram may have a predefined structure in which one or more fields and/or bits may be redefined for a specific purpose. The modified Register-0 Write datagram can maximize the amount of data written to high-priority registers, when a low-latency transaction is conducted over the serial bus.

The 1-bit Write/Read indicator 1768 indicates, in a first state, that a write operation is to be performed at one or more addressed one-wire slave devices 404 and indicates, in a second state, that a read operation is to be performed at the one or more addressed one-wire slave devices 404.

In some implementations, a byte count field 1770 is provided. The illustrated byte count field 1770 is a 1-bit field and indicates that the data payload 1776 carries one or two bytes with additional parity 1778. The size of the byte count field 1770 can be increased to indicate larger payload size, or omitted to indicate a fixed payload size. The meaning of the content of the byte count field 1770 may be defined by configuration. For example, a 1-bit value may select between one or two bytes, no bytes and one byte, two bytes and four bytes, or any combination of payload sizes indicated by configuration. The register address field 1772 follows and may consume the remaining bits of a control field (here 5 bits). The parity bit 1774 may provide odd or even parity as configured and/or based on implementation needs. In some implementations, the size of the register address field 1772 may be independently defined by configuration base on addressing needs in an application, for example. End of packet signaling such as a 2-bit BPC 1780 follows the data payload 1776 and associated parity 1778. The number of bits transmitted as parity 1778 may be defined by the byte count field 1770, where one parity bit is transmitted for each byte in the data payload 1776, for example.

In some implementations, joint PWM and phase modulation encoding may be used to increase the size of the data payload 1712, 1734, 1754, 1776 in a datagram 1700, 1720, 1740, 1760. In some examples, the number of bits in each control field may be increased when joint PWM and phase modulation encoding is used. In some examples, the number of bits in each control field may be maintained. In the latter examples, the meaning of certain fields may be change; for example, the byte count field 1708, 1728, 1750, 1770 may become a word count field when joint PWM and phase modulation encoding is used. In some examples, the number of bits in certain control fields may be changed. In the latter examples, the size of the byte count field 1708, 1728, 1750, 1770 may be doubled reflecting the increased size of the data payload 1712, 1734, 1754, 1776.

Certain aspects disclosed herein may relate to low-latency communications over a serial bus 408. The serial bus 408 may be operated in accordance with an RFFE protocol, or the like. In certain implementations, at least one one-wire slave device 404 is coupled to the SDATA line 410 of the serial bus 408, and one or more two-wire slave devices 406 are coupled to the SDATA line 410 and the SCLK line 412 of the serial bus 408. Two-wire slave devices 406 may be configured to communicate using conventional datagrams, which may be defined by RFFE protocols for example. A one-wire slave device 404 may be configured to communicate using datagrams optimized for transmission over a single wire. The one-wire slave device 404 may extract a clock signal from the SDATA line 410 where the clock signal is embedded in the data signal transmitted over the SDATA line 410. In one example, data is encoded using PWM, Phase modulation or some combination of these encoding schemes.

According to certain aspects, devices coupled to the serial bus may distinguish between 1-Wire and 2-Wire modes of communication based on the duration of an SSC. In some instances, timing information related to PWM and phase modulation encoding may be extracted from a 1-Wire SSC. In some instances, one or more additional clock cycles may be used to provide timing information related to PWM and phase modulation encoding.

In certain implementations, devices 402, 404, 406 coupled to the serial bus 408 may be configured with information that defines various operational aspects of the serial bus 408. In one example, the information may define the configuration and timing of SSCs, the type of encoding to be used for 1-wire communication, and/or the structure, configuration and size of datagrams to be used for 1-Wire communication, and/or the format, size and/or meaning of various fields provided in the datagrams used for 1-Wire communication.

The devices 402, 404, 406 may be globally configured and/or configured by group or individually. For example, the bus master 402 and one-wire slave devices 404 may be configured with information related to 1-Wire datagrams, SSCs and encoding techniques. In some instances, two-wire slave devices 406 need not be configured with information related to 1-Wire communication, when the 1-Wire communication does not impact the operation of the two-wire slave devices 406.

Configuration may be performed dynamically, and may be based on application requirements. Configuration may be performed after device power-on, and/or during system initialization or configuration. In some instances, configuration is performed during manufacture of devices 402, 404, 406 and/or during system assembly or integration.

Figure 18:
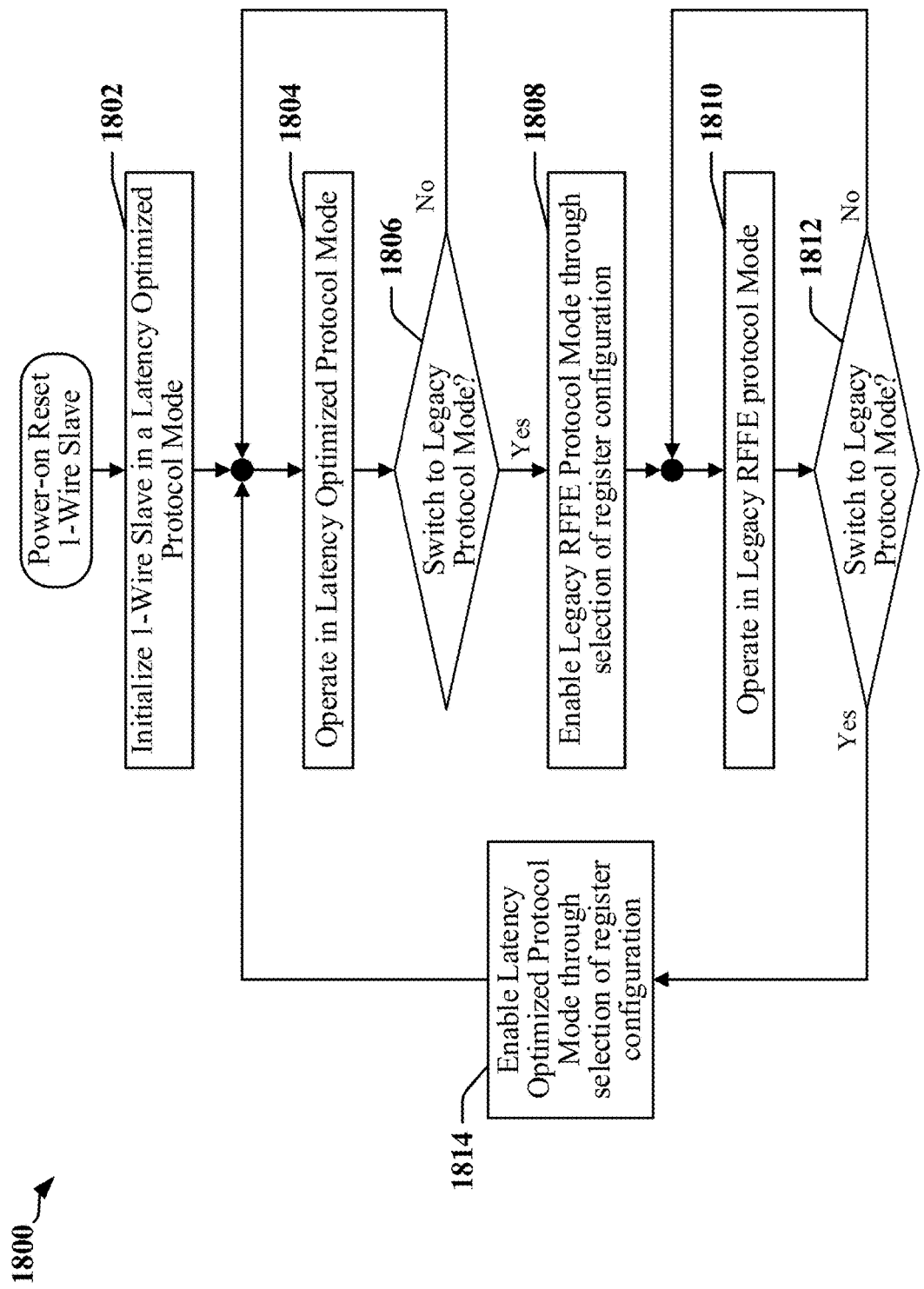
FIG. 18 is a flowchart illustrating the operation of one-wire slave device that is configurable for multiple protocols in accordance with certain aspects disclosed herein.

FIG. 18 is a flowchart 1800 illustrating the operation of one-wire slave device 404 that is configurable for multiple protocols, including a latency-optimized protocol. After a power-on reset or initialization, the one-wire slave device 404 may be configured at block 1802 for a latency-optimized protocol, and may communicate using one or more of the datagrams 1700, 1720, 1740, 1760 illustrated in FIG. 17. The latency-optimized protocol may be defined as the default configuration during manufacture, assembly and/or integration of the one-wire slave device 404. In some instances, the default configuration may be modified by application.

At block 1804, the one-wire slave device 404 is operating in a latency-optimized protocol mode, where transactions conducted over the SDATA line 410 use one or more of the datagrams 1700, 1720, 1740, 1760 to exchange information. At block 1806, the one-wire slave device 404 may determine that a change in protocol mode has been requested or commanded. For example, the one-wire slave device 404 may be requested or commanded to change to a legacy RFFE protocol mode. In some instances, the change in protocol mode may be signaled or effected through a configuration register setting, where the configuration may be written by a bus master 402 and/or an application that is resident on the one-wire slave device 404. In one example, the one-wire slave device 404 may change protocol mode at block 1808 to an RFFE protocol specified by standards defined by the MIPI Alliance, including the v2.1, v3.0 or a later version of the RFFE protocol. If no change in protocol mode is indicated or required at block 1806, then the one-wire slave device 404 may continue in the latency-optimized protocol mode at block 1804.

The one-wire slave device 404 may commence operating in the legacy RFFE protocol mode at block 1810. At block 1812, the one-wire slave device 404 may determine that a change in protocol mode has been requested or commanded, where the one-wire slave device 404 has been requested or commanded to change to the latency-optimized protocol mode. In some instances, the change in protocol mode may be signaled or effected through a configuration register setting, where the configuration may be written by a bus master 402 and/or an application that is resident on the one-wire slave device 404. The one-wire slave device 404 may switch to the latency-optimized protocol mode at block 1814 and may then operate in the latency-optimized protocol mode at block 1804. If no change in protocol mode is indicated or required at block 1812, then the one-wire slave device 404 may continue in the legacy RFFE protocol mode at block 1810.

Examples of Processing Circuits and Methods

Figure 19:
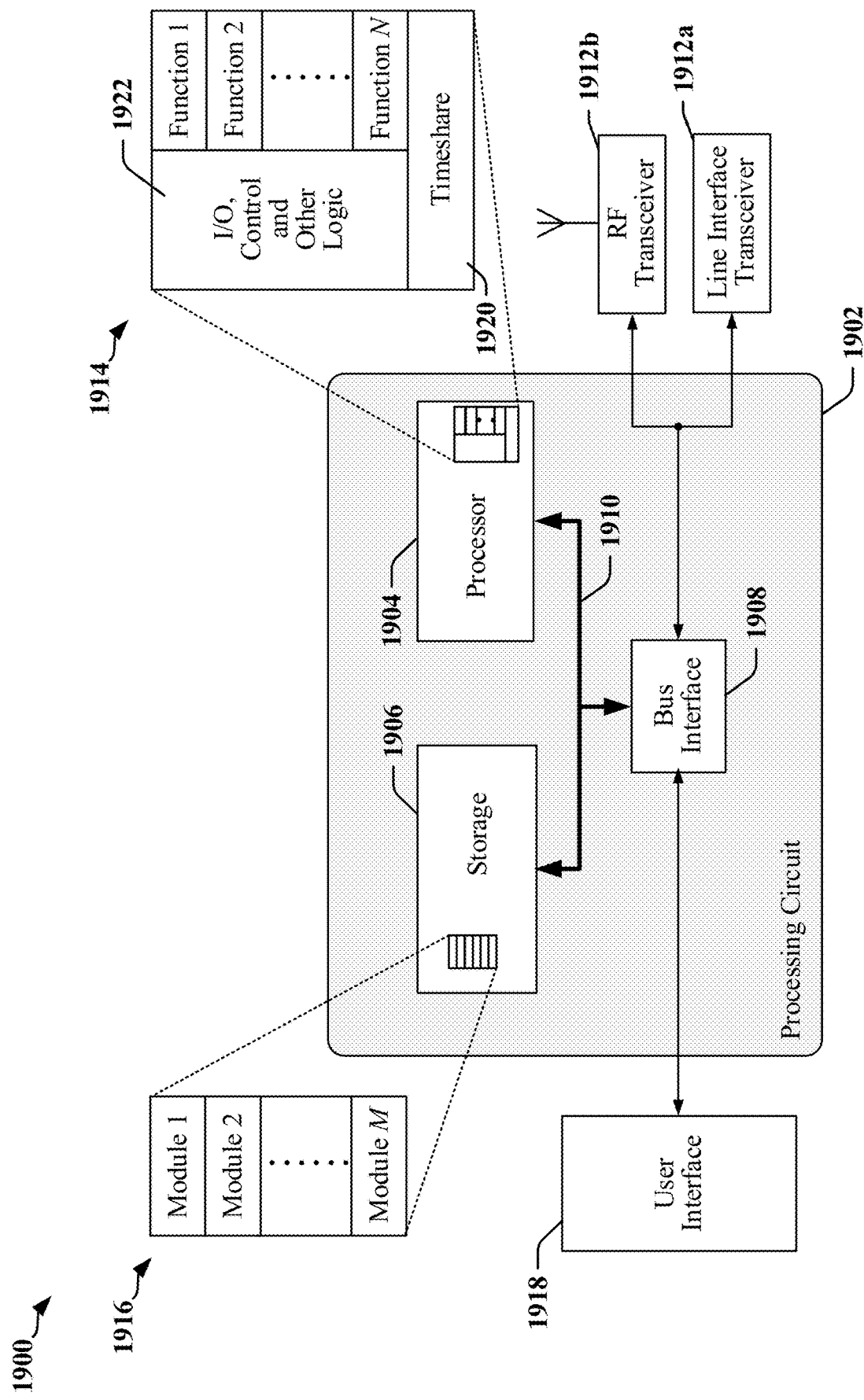
FIG. 19 illustrates one example of an apparatus employing a processing circuit that may be adapted according to certain aspects disclosed herein.

FIG. 19 is a diagram illustrating an example of a hardware implementation for an apparatus 1900. In some examples, the apparatus 1900 may perform one or more functions disclosed herein. In accordance with various aspects of the disclosure, an element, or any portion of an element, or any combination of elements as disclosed herein may be implemented using a processing circuit 1902. The processing circuit 1902 may include one or more processors 1904 that are controlled by some combination of hardware and software modules. Examples of processors 1904 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1904 may include specialized processors that perform specific functions, and that may be configured, augmented or controlled by one of the software modules 1916. The one or more processors 1904 may be configured through a combination of software modules 1916 loaded during initialization, and further configured by loading or unloading one or more software modules 1916 during operation.

In the illustrated example, the processing circuit 1902 may be implemented with a bus architecture, represented generally by the bus 1910. The bus 1910 may include any number of interconnecting buses and bridges depending on the specific application of the processing circuit 1902 and the overall design constraints. The bus 1910 links together various circuits including the one or more processors 1904, and storage 1906. Storage 1906 may include memory devices and mass storage devices, and may be referred to herein as computer-readable media and/or processor-readable media. The bus 1910 may also link various other circuits such as timing sources, timers, peripherals, voltage regulators, and power management circuits. A bus interface 1908 may provide an interface between the bus 1910 and one or more transceivers 1912a, 1912b. A transceiver 1912a, 1912b may be provided for each networking technology supported by the processing circuit. In some instances, multiple networking technologies may share some or all of the circuitry or processing modules found in a transceiver 1912a, 1912b. Each transceiver 1912a, 1912b provides a means for communicating with various other apparatus over a transmission medium. In one example, a transceiver 1912a may be used to couple the apparatus 1900 to a multi-wire bus. In another example, a transceiver 1912b may be used to connect the apparatus 1900 to a radio access network. Depending upon the nature of the apparatus 1900, a user interface 1918 (e.g., keypad, display, speaker, microphone, joystick) may also be provided, and may be communicatively coupled to the bus 1910 directly or through the bus interface 1908.

A processor 1904 may be responsible for managing the bus 1910 and for general processing that may include the execution of software stored in a computer-readable medium that may include the storage 1906. In this respect, the processing circuit 1902, including the processor 1904, may be used to implement any of the methods, functions and techniques disclosed herein. The storage 1906 may be used for storing data that is manipulated by the processor 1904 when executing software, and the software may be configured to implement any one of the methods disclosed herein.

One or more processors 1904 in the processing circuit 1902 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1906 or in an external computer-readable medium. The external computer-readable medium and/or storage 1906 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1906 may also include, by way of example, a carrier wave, a transmission line, and any other suitable medium for transmitting software and/or instructions that may be accessed and read by a computer. Computer-readable medium and/or the storage 1906 may reside in the processing circuit 1902, in the processor 1904, external to the processing circuit 1902, or be distributed across multiple entities including the processing circuit 1902. The computer-readable medium and/or storage 1906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1906 may maintain software maintained and/or organized in loadable code segments, modules, applications, programs, etc., which may be referred to herein as software modules 1916. Each of the software modules 1916 may include instructions and data that, when installed or loaded on the processing circuit 1902 and executed by the one or more processors 1904, contribute to a run-time image 1914 that controls the operation of the one or more processors 1904. When executed, certain instructions may cause the processing circuit 1902 to perform functions in accordance with certain methods, algorithms and processes described herein.

Some of the software modules 1916 may be loaded during initialization of the processing circuit 1902, and these software modules 1916 may configure the processing circuit 1902 to enable performance of the various functions disclosed herein. For example, some software modules 1916 may configure internal devices and/or logic circuits 1922 of the processor 1904, and may manage access to external devices such as a transceiver 1912a, 1912b, the bus interface 1908, the user interface 1918, timers, mathematical coprocessors, and so on. The software modules 1916 may include a control program and/or an operating system that interacts with interrupt handlers and device drivers, and that controls access to various resources provided by the processing circuit 1902. The resources may include memory, processing time, access to a transceiver 1912a, 1912b, the user interface 1918, and so on.

One or more processors 1904 of the processing circuit 1902 may be multifunctional, whereby some of the software modules 1916 are loaded and configured to perform different functions or different instances of the same function. The one or more processors 1904 may additionally be adapted to manage background tasks initiated in response to inputs from the user interface 1918, the transceiver 1912*a*, 1912*b*, and device drivers, for example. To support the performance of multiple functions, the one or more processors 1904 may be configured to provide a multitasking environment, whereby each of a plurality of functions is implemented as a set of tasks serviced by the one or more processors 1904 as needed or desired. In one example, the multitasking environment may be implemented using a timesharing program 1920 that passes control of a processor 1904 between different tasks, whereby each task returns control of the one or more processors 1904 to the timesharing program 1920 upon completion of any outstanding operations and/or in response to an input such as an interrupt. When a task has control of the one or more processors 1904, the processing circuit is effectively specialized for the purposes addressed by the function associated with the controlling task. The timesharing program 1920 may include an operating system, a main loop that transfers control on a round-robin basis, a function that allocates control of the one or more processors 1904 in accordance with a prioritization of the functions, and/or an interrupt driven main loop that responds to external events by providing control of the one or more processors 1904 to a handling function.

Methods for optimizing virtual GPIO latency may include an act of parsing various input sources including sources of GPIO signal state, parameters and/or messages to be transmitted. The input sources may include hardware events, configuration data, mask parameters, and register addresses. Packet-specific latency estimators may be employed to estimate the latency for corresponding packet types based upon the parsed parameters. A packet type to be used for transmission may be selected based on the minimum latency calculated or determined for available packet types. The selected packet type may be identified using a command code, which may be provided to a packetizer with a payload to be transmitted. The command code may also reflect a protocol to be used to transmit the payload. In some implementations, the physical link used to transmit the payload may be operated according to different protocols or different variants of one or more protocols. The protocol to be used for transmitting the payload may be selected based on latencies associated with the various available protocols or variants of protocols.

Figure 20:
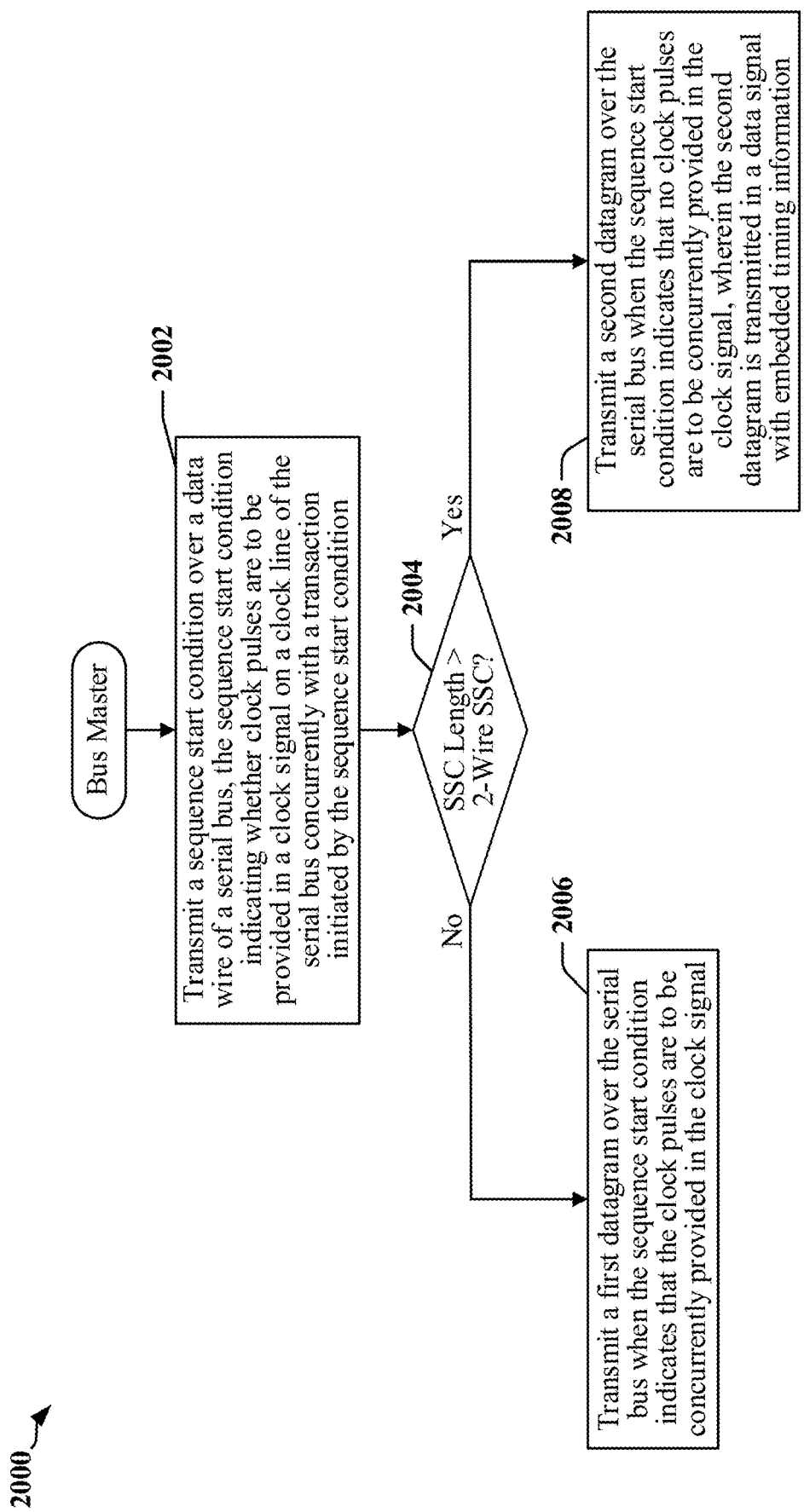
FIG. 20 is a flowchart that illustrates a method for data communication at a master device in accordance with certain aspects disclosed herein.

FIG. 20 is a flowchart 2000 of a method that may be performed by a master device coupled to a serial bus. One or more one-wire slave devices and one or more two-wire slave devices may be coupled to the serial bus. The master device may exchange PWM-encoded and/or phase-encoded frames of data with the one-wire slave devices.

At block 2002, the master device may transmit an SSC over a data wire of a serial bus. The SSC indicates whether clock pulses are to be provided in a clock signal on a clock wire of the serial bus concurrently with a transaction initiated by the SSC. The clock wire is coupled to the two-wire slave devices and is not coupled to the one-wire slave devices. The clock pulses are transmitted when a two-wire slave device is to participate in the transaction. The clock pulses are suppressed when a one-wire slave device is to participate in the transaction.

At block 2004, the master device may determine a type of communication to be transacted over the serial bus. The duration of the SSC corresponds to the type of communication. In various examples, the SSC has a first duration when indicating that the clock pulses are to be concurrently provided in the clock signal and a second duration longer than the first duration when indicating that no clock pulses are to be concurrently provided in the clock signal. In one example, a 1-Wire SSC preceding a 1-Wire transaction has a duration greater than the duration of the 2-Wire SSC preceding a 2-Wire transaction. When the duration of the SSC exceeds the duration of a 2-Wire SSC, then the master device may proceed to block 2008. When the duration of the SSC does not exceed the duration of a 2-Wire SSC, then the master device may proceed to block 2006.

At block 2006, the master device may transmit a first datagram over the serial bus when the SSC indicates that the clock pulses are to be concurrently provided in the clock signal. The first datagram is transmitted with pulses in the clock signal to enable a two-wire slave device to receive the first datagram.

At block 2008, the master device may transmit a second datagram over the serial bus when the SSC indicates that no clock pulses are to be concurrently provided in the clock signal. The second datagram is transmitted in a data signal with embedded timing information. The second datagram may be directed to one or more one-wire slave devices.

In some instances, the serial bus may be reserved or configured for 1-Wire operation. In one example, the serial bus may be coupled to one-wire slave devices 404 and no two-wire slave devices 406 are coupled to the serial bus or active on the serial bus. In another example, all devices coupled to the serial bus are configured and/or limited to 1-Wire modes of communication. When two-wire modes of communication are disabled or prohibited, the bus master may suppress transmission of SSCs that have the first duration, thereby reserving the serial bus for one-wire modes of communication.

In some instances, transmitting the SSC includes causing a signaling state of the data wire to transition from a first voltage level to a second voltage level while suppressing transitions on the clock wire when the data wire and the clock wire are determined to be idle. The idle signaling state may be defined as the first voltage level or the second voltage level by a configuration register. The active level of a pulse may be the opposite of the idle state.

In certain examples, first data is encoded in the data signal using a pulse-width modulation encoder. Second data may be encoded in the data signal using a phase modulation encoder. The master device may transmit a bit-timing reference over the data wire before transmitting the second datagram. The master device may control timing of the SSC using a first clock frequency. The master device may pulse-width modulate the data signal using a second clock frequency. The master device may select the second clock frequency responsive to timing information in the bit-timing reference.

Figure 21:
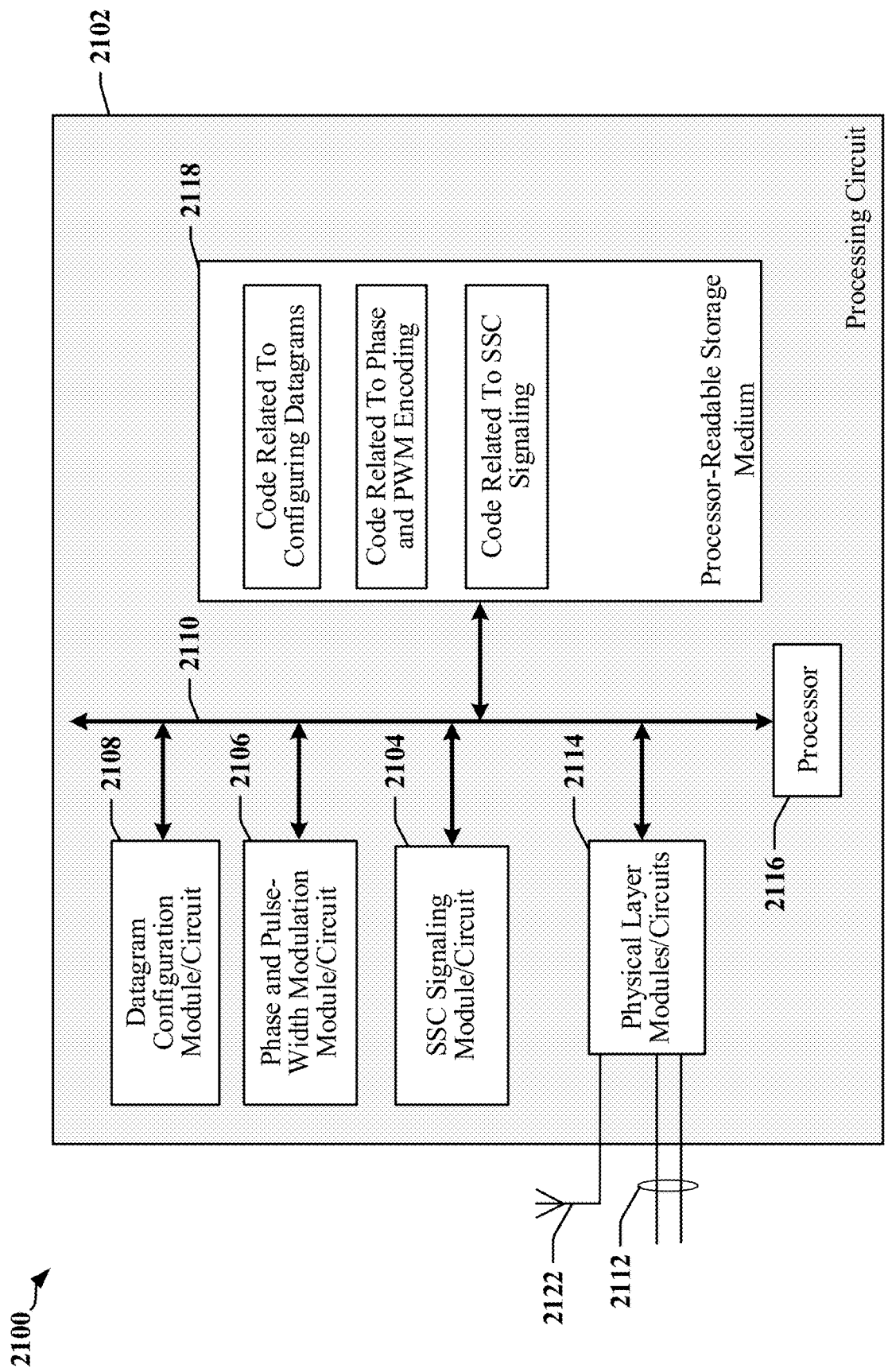
FIG. 21 illustrates an example of a hardware implementation for a bus master apparatus adapted in accordance with certain aspects disclosed herein.

FIG. 21 is a diagram illustrating a simplified example of a hardware implementation for an apparatus 2100 employing a processing circuit 2102. The processing circuit typically has a controller or processor 2116 that may include one or more microprocessors, microcontrollers, digital signal processors, sequencers and/or state machines. The processing circuit 2102 may be implemented with a bus architecture, represented generally by the bus 2110. The bus 2110 may include any number of interconnecting buses and bridges depending on the specific application of the processing circuit 2102 and the overall design constraints. The bus 2110 links together various circuits including one or more processors and/or hardware modules, represented by the controller or processor 2116, the modules or circuits 2104, 2106 and 2108 and the processor-readable storage medium 2118. One or more physical layer circuits and/or modules 2114 may be provided to support communications over a communication link implemented using a multi-wire bus 2112, through an antenna or antenna array 2122 (to a radio access network for example), and so on. The bus 2110 may also link various other circuits such as timing sources, peripherals, voltage regulators, and power management circuits, which are well known in the art, and therefore, will not be described any further.

The processor 2116 is responsible for general processing, including the execution of software, code and/or instructions stored on the processor-readable storage medium 2118. The processor-readable storage medium may include a non-transitory storage medium. The software, when executed by the processor 2116, causes the processing circuit 2102 to perform the various functions described supra for any particular apparatus. The processor-readable storage medium may be used for storing data that is manipulated by the processor 2116 when executing software. The processing circuit 2102 further includes at least one of the modules 2104, 2106 and 2108. The modules 2104, 2106 and 2108 may be software modules running in the processor 2116, resident/stored in the processor-readable storage medium 2118, one or more hardware modules coupled to the processor 2116, or some combination thereof. The modules 2104, 2106 and 2108 may include microcontroller instructions, state machine configuration parameters, or some combination thereof.

In one configuration, the apparatus 2100 includes modules and/or circuits 2104 adapted to provide SSCs that indicate whether a 1-Wire transaction or a 2-Wire transaction is to be conducted over the serial bus. The apparatus 2100 may include modules and/or circuits 2106 adapted to encode data in PWM or phase-modulated datagrams, and modules and/or circuits 2108 adapted to configure and construct datagrams optimized for 1-Wire and 2-Wire transactions.

In one example, the apparatus 2100 includes physical layer circuits and/or modules 2114 that implement an interface circuit adapted to couple the apparatus 2100 to a serial bus. The apparatus 2100 may have a protocol controller configured to transmit a SSC over a data wire of a serial bus, the SSC indicating whether clock pulses are to be provided in a clock signal on a clock wire of the serial bus concurrently with a transaction initiated by the SSC, transmit a first datagram over the serial bus when the SSC indicates that the clock pulses are to be concurrently provided in the clock signal, and transmit a second datagram over the serial bus when the SSC indicates that no clock pulses are to be concurrently provided in the clock signal. The second datagram may be transmitted in a data signal with embedded timing information.

The SSC may have a first duration when indicating that the clock pulses are to be concurrently provided in the clock signal and a second duration longer than the first duration when indicating that no clock pulses are to be concurrently provided in the clock signal.

The apparatus 2100 may include a pulse-width modulation encoder configured to encode first data in the data signal, and/or a phase modulation encoder configured to encode second data in the data signal.

In some implementations, the protocol controller is further configured to transmit a bit-timing reference over the data wire before transmitting the second datagram. The protocol controller may be further configured to control timing of the SSC using a first clock frequency, and pulse-width modulate the data signal using a second clock frequency. The second clock frequency may be selected responsive to the bit-timing reference.

The processor-readable storage medium 2118 may include transitory or non-transitory storage devices configured to store code, instructions and/or parameters used to implement one or more methods or procedures disclosed herein. The processor-readable storage medium 2118 may include code for transmitting an SSC over a data wire of a serial bus, the SSC indicating whether clock pulses are to be provided in a clock signal on a clock wire of the serial bus concurrently with a transaction initiated by the SSC. The processor-readable storage medium 2118 may include code for transmitting a first datagram over the serial bus when the SSC indicates that the clock pulses are to be concurrently provided in the clock signal, and transmitting a second datagram over the serial bus when the SSC indicates that no clock pulses are to be concurrently provided in the clock signal. The second datagram may be transmitted in a data signal with embedded timing information.

Figure 22:
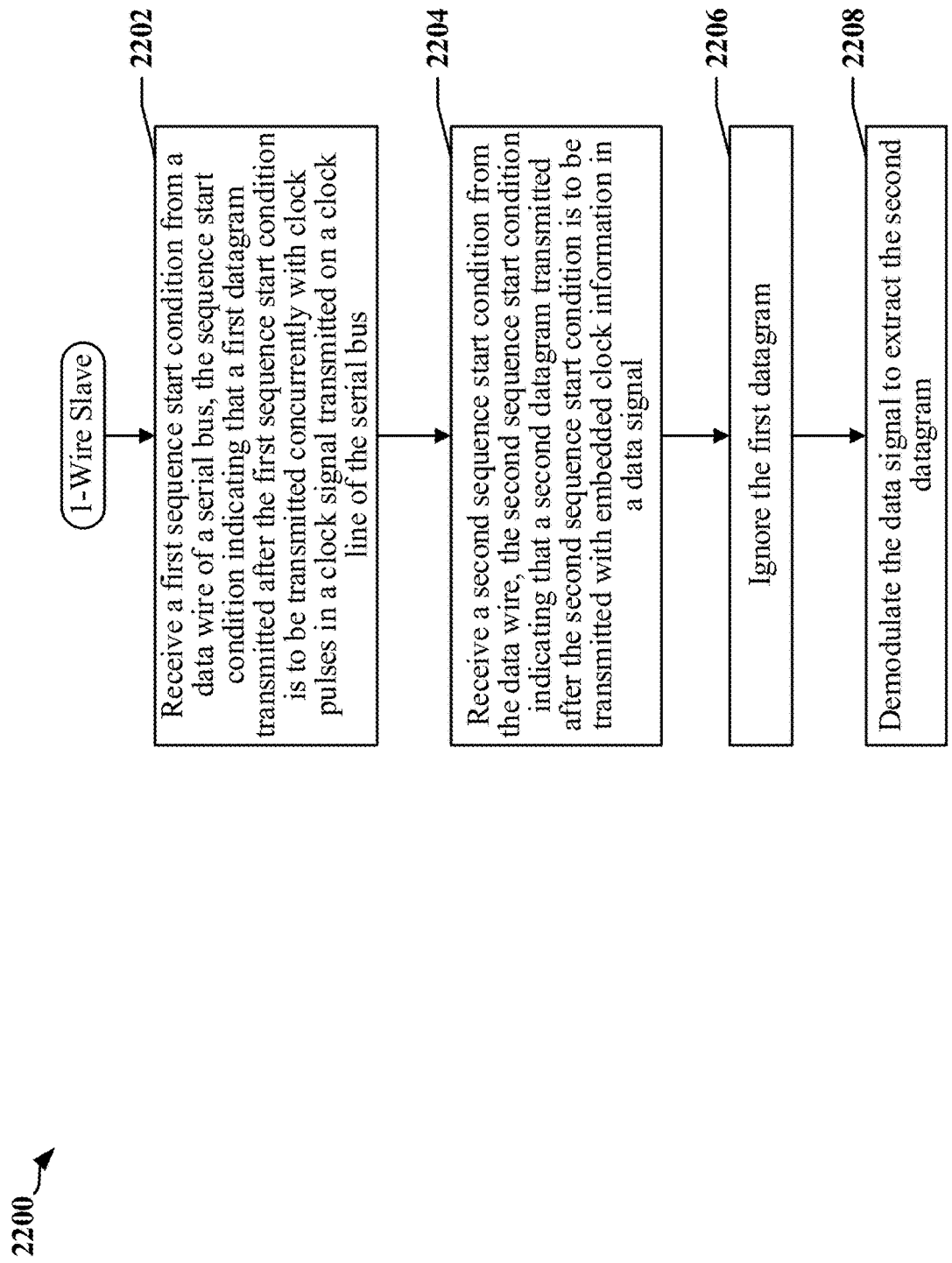
FIG. 22 is a flowchart that illustrates a method for data communication at a 1-Wire slave device in accordance with certain aspects disclosed herein.

FIG. 22 is a flowchart 2200 of a method that may be performed by a one-wire slave device coupled to a serial bus. At least one bus master is coupled to the serial bus. One or more one-wire slave devices and one or more two-wire slave devices may be coupled to the serial bus. The master device may exchange PWM-encoded and/or phase-encoded frames of data with the one-wire slave devices.

At block 2202, the one-wire slave device may receive a first SSC from a data wire of a serial bus. The first SSC indicates that a first datagram transmitted after the first SSC is to be transmitted concurrently with clock pulses in a clock signal transmitted on a clock wire of the serial bus. At block 2204, the one-wire slave device may receive a second SSC from the data wire. The second SSC may indicate that a second datagram transmitted after the second SSC is to be transmitted with embedded clock information in a data signal. The first SSC and the second SSC have different durations. At block 2206, the one-wire slave device may ignore the first datagram. At block 2208, the one-wire slave device may demodulate the data signal to extract the second datagram.

In certain implementations, the one-wire slave device may use a pulse-width modulation decoder to demodulate the data signal. The one-wire slave device may use a phase modulation decoder to demodulate the data signal. The one-wire slave device may receive a bit-timing reference from the data wire after receiving the second SSC. The one-wire slave device may configure the pulse-width modulation decoder using timing information obtained from the bit-timing reference.

Figure 23:
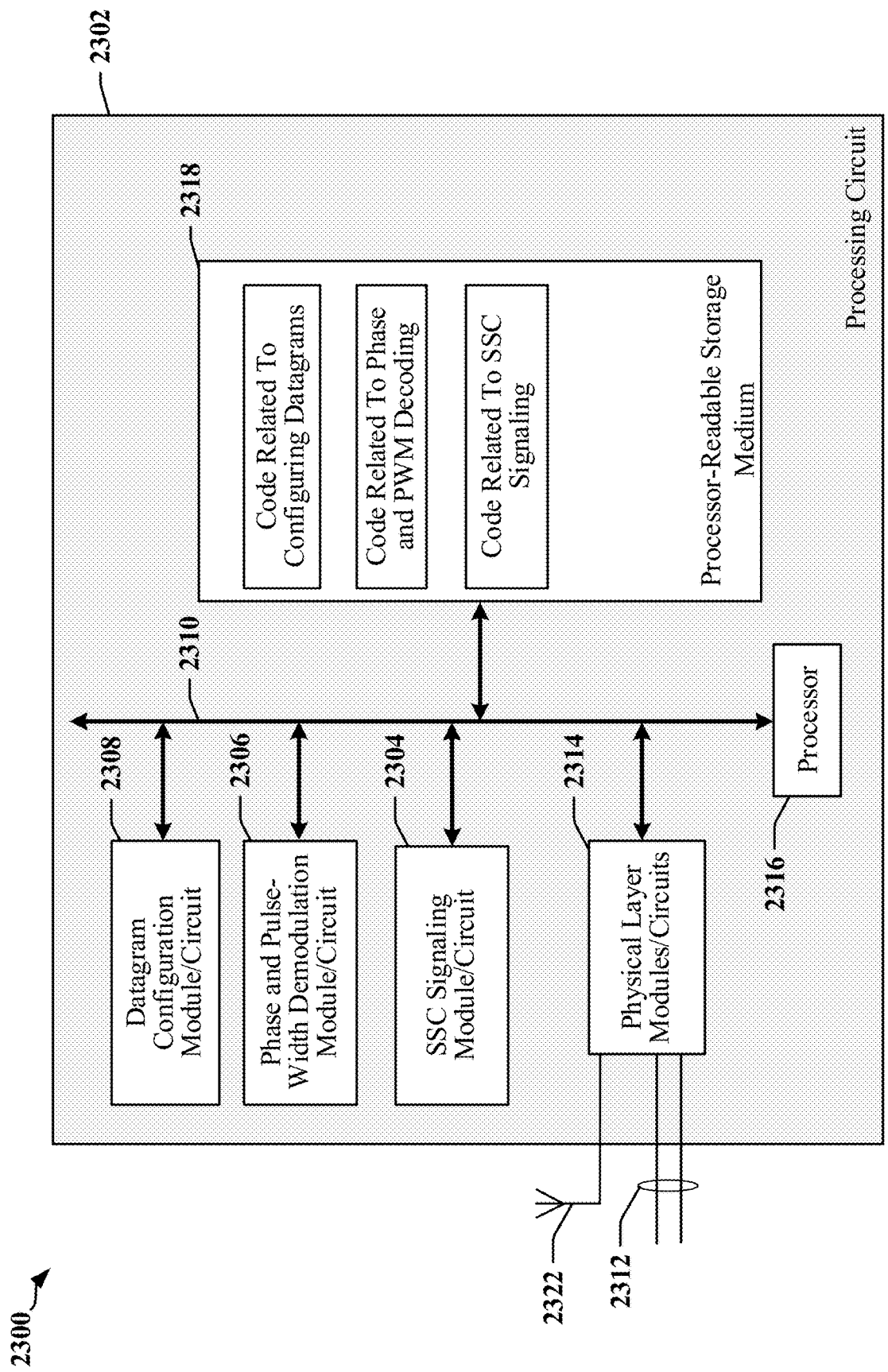
FIG. 23 illustrates an example of a hardware implementation for a 1-Wire slave apparatus adapted in accordance with certain aspects disclosed herein.

FIG. 23 is a diagram illustrating a simplified example of a hardware implementation for an apparatus 2300 employing a processing circuit 2302. The processing circuit typically has a controller or processor 2316 that may include one or more microprocessors, microcontrollers, digital signal processors, sequencers and/or state machines. The processing circuit 2302 may be implemented with a bus architecture, represented generally by the bus 2310. The bus 2310 may include any number of interconnecting buses and bridges depending on the specific application of the processing circuit 2302 and the overall design constraints. The bus 2310 links together various circuits including one or more processors and/or hardware modules, represented by the controller or processor 2316, the modules or circuits 2304, 2306 and 2308 and the processor-readable storage medium 2318. One or more physical layer circuits and/or modules 2314 may be provided to support communications over a communication link implemented using a multi-wire bus 2312, through an antenna or antenna array 2322 (to a radio access network for example), and so on. The bus 2310 may also link various other circuits such as timing sources, peripherals, voltage regulators, and power management circuits, which are well known in the art, and therefore, will not be described any further.

The processor 2316 is responsible for general processing, including the execution of software, code and/or instructions stored on the processor-readable storage medium 2318. The processor-readable storage medium may include a non-transitory storage medium. The software, when executed by the processor 2316, causes the processing circuit 2302 to perform the various functions described supra for any particular apparatus. The processor-readable storage medium may be used for storing data that is manipulated by the processor 2316 when executing software. The processing circuit 2302 further includes at least one of the modules 2304, 2306 and 2308. The modules 2304, 2306 and 2308 may be software modules running in the processor 2316, resident/stored in the processor-readable storage medium 2318, one or more hardware modules coupled to the processor 2316, or some combination thereof. The modules 2304, 2306 and 2308 may include microcontroller instructions, state machine configuration parameters, or some combination thereof.

In one configuration, the apparatus 2300 includes modules and/or circuits 2304 adapted to process SSCs that indicate whether a 1-Wire transaction or a 2-Wire transaction is to be conducted over the serial bus. The apparatus 2300 may include modules and/or circuits 2306 adapted to decode data from PWM or phase-modulated datagrams, and modules and/or circuits 2308 adapted to deconstruct datagrams optimized for 1-Wire and 2-Wire transactions.

In one example, the apparatus 2300 includes physical layer circuits and/or modules 2314 that implement an interface circuit adapted to couple the apparatus 2300 to a serial bus. The apparatus 2300 may have a protocol controller configured to receive a first SSC from a data wire of a serial bus, the SSC indicating that a first datagram transmitted after the first SSC is to be transmitted concurrently with clock pulses in a clock signal transmitted on a clock wire of the serial bus, receive a second SSC from the data wire, the second SSC indicating that a second datagram transmitted after the second SSC is to be transmitted with embedded clock information in a data signal, ignore the first datagram, and demodulate the data signal to extract the second datagram.

The first SSC and the second SSC may have different durations. The protocol controller may be further configured to use a pulse-width modulation decoder to demodulate the data signal. The protocol controller may be further configured to use a phase modulation decoder to demodulate the data signal. The protocol controller may be further configured to receive a bit-timing reference from the data wire after receiving the second SSC. The protocol controller may be further configured to configure the pulse-width modulation decoder using timing information obtained from the bit-timing reference.

The processor-readable storage medium 2318 may include transitory or non-transitory storage devices configured to store code, instructions and/or parameters used to implement one or more methods or procedures disclosed herein. The processor-readable storage medium 2318 may include code for receiving a first SSC from a data wire of a serial bus, the first SSC indicating that a first datagram transmitted after the first SSC is to be transmitted concurrently with clock pulses in a clock signal transmitted on a clock wire of the serial bus. The processor-readable storage medium 2318 may include code for receiving a second SSC from the data wire, the second SSC indicating that a second datagram transmitted after the second SSC is to be transmitted with embedded clock information in a data signal. The processor-readable storage medium 2318 may include code for demodulating the data signal to extract the second datagram while ignoring the first datagram.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of data communication, comprising:
   transmitting a sequence start condition over a data wire of a serial bus, the sequence start condition indicating whether clock pulses are to be provided in a clock signal on a clock wire of the serial bus concurrently with a transaction initiated by the sequence start condition;
   transmitting a first datagram over the serial bus when the sequence start condition indicates that the clock pulses are to be concurrently provided in the clock signal;
   transmitting a second datagram over the serial bus when the sequence start condition indicates that no clock pulses are to be concurrently provided on the clock wire of the serial bus, wherein the second datagram is transmitted in a data signal with embedded timing information; and
   suppressing transmission of sequence start conditions that indicate the clock pulses are to be concurrently provided in the clock signal when the serial bus is reserved for one-wire mode of communication.

2. The method of claim 1, wherein the sequence start condition has a first duration when indicating that the clock pulses are to be concurrently provided in the clock signal and a second duration longer than the first duration when indicating that no clock pulses are to be concurrently provided on the clock wire of the serial bus.

3. The method of claim 1, wherein first data is encoded in the data signal using a pulse-width modulation encoder.

4. The method of claim 3, wherein second data is encoded in the data signal using a phase modulation encoder.

5. The method of claim 3, further comprising:
transmitting a bit-timing reference over the data wire before transmitting the second datagram.

6. The method of claim 5, further comprising:
controlling timing of the sequence start condition using a first clock frequency; and
pulse-width modulating the data signal using a second clock frequency.

7. The method of claim 6, wherein the second clock frequency is identified by the bit-timing reference.

8. The method of claim 1, wherein transmitting the sequence start condition comprises:
causing a signaling state of the data wire to transition from a first voltage level to a second voltage level while suppressing transitions on the clock wire when the data wire and the clock wire are determined to be idle, wherein an idle signaling state is defined as the first voltage level or the second voltage level by a configuration register.

9. A data communication apparatus, comprising:
an interface circuit adapted to couple the data communication apparatus to two wires of a serial bus; and
a protocol controller configured to:
transmit a sequence start condition over a data wire of the serial bus, the sequence start condition indicating whether clock pulses are to be provided in a clock signal on a clock wire of the serial bus concurrently with a transaction initiated by the sequence start condition;
transmit a first datagram over the serial bus when the sequence start condition indicates that the clock pulses are to be concurrently provided in the clock signal;
transmit a second datagram over the serial bus when the sequence start condition indicates that no clock pulses are to be concurrently provided on the clock wire of the serial bus,
wherein the second datagram is transmitted in a data signal with embedded timing information; and
suppress transmission of sequence start conditions that indicate the clock pulses are to be concurrently provided in the clock signal when the serial bus is reserved for one-wire mode of communication.

10. The data communication apparatus of claim 9, wherein the sequence start condition has a first duration when indicating that the clock pulses are to be concurrently provided in the clock signal and a second duration longer than the first duration when indicating that no clock pulses are to be concurrently provided on the clock wire of the serial bus.

11. The data communication apparatus of claim 9, further comprising:
a pulse-width modulation encoder configured to encode first data in the data signal.

12. The data communication apparatus of claim 11, further comprising:
a phase modulation encoder configured to encode second data in the data signal.

13. The data communication apparatus of claim 11, wherein the protocol controller is further configured to:
transmit a bit-timing reference over the data wire before transmitting the second datagram.

14. The data communication apparatus of claim 13, wherein the protocol controller is further configured to:
control timing of the sequence start condition using a first clock frequency; and
pulse-width modulate the data signal using a second clock frequency.

15. The data communication apparatus of claim 14, wherein the second clock frequency is identified by the bit-timing reference.

16. The data communication apparatus of claim 9, wherein the protocol controller transmits the sequence start condition by:
causing a signaling state of the data wire to transition from a first voltage level to a second voltage level while suppressing transitions on the clock wire when the data wire and the clock wire are determined to be idle, wherein an idle signaling state is defined as the first voltage level or the second voltage level by a configuration register.

* * * * *